US007291213B2

(12) United States Patent
Ogawa et al.

(10) Patent No.: US 7,291,213 B2

(45) Date of Patent: Nov. 6, 2007

(54) INK COMPOSITION AND INKJET RECORDING METHOD

(75) Inventors: Manabu Ogawa, Shizuoka (JP); Keiichi Tateishi, Kanagawa (JP)

(73) Assignee: Fujifilm Corporation, Tokyo (JP)

(*) Notice: Subject to any disclaimer, the term of this patent is extended or adjusted under 35 U.S.C. 154(b) by 0 days.

(21) Appl. No.: 11/208,747

(22) Filed: Aug. 23, 2005

(65) Prior Publication Data

US 2006/0065156 A1 Mar. 30, 2006

(30) Foreign Application Priority Data

Aug. 24, 2004 (JP) .......................... P.2004-243337

(51) Int. Cl.
*C09D 11/00* (2006.01)
*C09D 11/02* (2006.01)
*B41J 2/01* (2006.01)

(52) U.S. Cl. .............................. 106/31.43; 106/31.75; 106/31.46; 106/31.47; 106/31.49; 106/31.59; 106/31.76; 106/31.77; 106/31.78; 106/31.89; 347/100

(58) Field of Classification Search ............ 106/31.43, 106/31.75, 31.46, 31.47, 31.49, 31.59, 31.76, 106/31.77, 31.78, 31.89; 347/100
See application file for complete search history.

(56) References Cited

U.S. PATENT DOCUMENTS

| | | | | |
|---|---|---|---|---|
| 4,043,820 | A * | 8/1977 | Landau | 106/31.18 |
| 5,425,805 | A * | 6/1995 | Botros et al. | 106/31.43 |
| 5,449,400 | A * | 9/1995 | Van Lint et al. | 106/31.28 |
| 5,720,801 | A * | 2/1998 | Nadan et al. | 106/31.16 |
| 6,100,315 | A * | 8/2000 | Kitamura et al. | 523/160 |
| 6,156,111 | A | 12/2000 | Schwarz | |
| 6,211,265 | B1 * | 4/2001 | Ohta et al. | 523/160 |
| 6,498,222 | B1 * | 12/2002 | Kitamura et al. | 526/307.2 |
| 2004/0194661 | A1 * | 10/2004 | Taguchi et al. | 106/31.48 |
| 2005/0117007 | A1 * | 6/2005 | Kosaka | 347/100 |

FOREIGN PATENT DOCUMENTS

| | | | |
|---|---|---|---|
| EP | 0 909 798 | A1 | 4/1999 |
| EP | 1 152 017 | A1 | 11/2001 |
| EP | 1 340 796 | A1 | 9/2003 |
| JP | 2002-294117 | A | 10/2002 |
| JP | 2002-356639 | A | 12/2002 |
| JP | 2003-138184 | A | 5/2003 |
| JP | 2003-138185 | A | 5/2003 |

OTHER PUBLICATIONS

English translation of JP 2003/138184, Sep. 2003.*

STN Reg File printout of the structure of Direct Blue 86 and Direct Blue 199, 5 pages, Nov. 1984.*

STN Reg File printout of SURFYNOL 104 and 465, 2 pages, Nov. 1984.*

Patent Abstracts of Japan (JP-A-05-059312)—Ishii Kenichi, "Fading Ink Composition", Mar. 1993.

Patent Abstracts of Japan (JP-A-62-161872)—Taki Tsutomu, "Recording Liquid", Jul. 1987.

Patent Abstracts of Japan (JP-A-2003-138184)—Ito Yuji, "Ink Composition, Recording Medium, Ink-Jet Recording Method and Recorded Material", May 2003.

European Search Report dated Nov. 21, 2005.

* cited by examiner

*Primary Examiner*—Helene Klemanski
(74) *Attorney, Agent, or Firm*—Sughrue Mion, PLLC

(57) ABSTRACT

An ink composition comprising: a coloring agent having an oxidation potential of more electropositive than 1.0V (vs SCE); a water; a guanidine compound; and a surfactant, the ink composition to be used in inkjet recording and an inkjet recording method with the use of the ink composition.

11 Claims, No Drawings

INK COMPOSITION AND INKJET RECORDING METHOD

BACKGROUND OF THE INVENTION

1. Field of the Invention

This invention relates to an ink composition, in particular, an ink composition for inkjet recording which is excellent in the image durability in storage and, among all, fastness to gas and penetration into paper.

2. Description of the Related Art

With the recent diffusion of computers, inkjet printers have been widely employed in printing on papers, films, fabrics and so on not only in offices but also in homes.

Inkjet recording methods include a system of jetting ink droplets under pressurization with the use of a piezo device, a system of foaming an ink by heating and thus jetting ink droplets, a system using ultrasonic wave, and a system of electrostatically sucking and jetting ink droplets. As ink compositions for inkjet recording by these systems, use is made of water-base inks, oil-base inks or solid (molten) inks. Among these inks, water-base inks are mainly employed from the viewpoints of production, handling properties, odor, safety and so on.

Requirements for a coloring agent to be used in these inkjet recording inks are as follows: being highly soluble in solvents, enabling high density recording, having a favorable color hue, having high fastness to light, heat, air, water and chemicals, having favorable fixation properties on an image receiving material with little bleeding, being excellent in storage properties as an ink, having no toxicity, having a high purity, and being available at a low cost. However, it is highly difficult to search for a coloring agent satisfying these requirements at a high level.

Although various dyes and pigments have been already proposed and practically employed in inkjet recording, no coloring agent satisfying all of the above requirements has been found out yet. Using well-known dyes and pigments typified by those having color indexes (C.I.) assigned thereto, it is highly difficult to satisfy both of such color hue and fastness as required in inkjet recording inks.

When a recorded image is exposed to the atmosphere over a long period of time, in particular, a cyan ink is seriously deteriorated and the image becomes reddish in some cases. It appears that the cyan ink deterioration is caused by various oxidative gases typified by ozone contained in the atmosphere.

As examples of a method for improving the fastness to gas (fastness to ozone), JP-A-2002-294117, JP-A-2002-356639, JP-A-2003-138184 and JP-A-2003-138185 disclose methods of improving the fastness to gas (fastness to ozone) by adding a specific compound. However, the thus achieved the fastness to gas (fastness to ozone) is still insufficient.

SUMMARY OF THE INVENTION

The problem that the invention is to solve is to provide an ink composition, preferably a cyan ink for inkjet recording, which enables the formation of a high-quality image free from bleeding or beading and is excellent in the image durability in storage and, among all, fastness to gas (fastness to ozone), and an inkjet recording method.

The above-described object of the invention can be achieved by the following means.

(1) An ink composition comprising:

a coloring agent having an oxidation potential of more electropositive than 1.0V (vs SCE);

a water;

a guanidine compound; and a surfactant.

(2) The ink composition as described in (1) above, wherein a content of the guanidine compound in the ink composition is from 0.1 to 10% by mass.

(3) The ink composition as described in (1) or (2) above, wherein the guanidine compound is a compound represented by formula (1):

Formula (1)

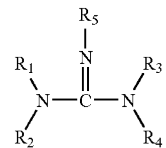

wherein $R_1$, $R_2$, $R_3$ and $R_4$ each independently represents a hydrogen atom, an alkyl group, an alkoxy group, an aryl group, a heterocyclic group or an amino group; and $R_5$ represents a hydrogen atom, an alkyl group, an alkoxy group, an aryl group or a heterocyclic group, provided that these alkyl, alkoxy, aryl, heterocyclic and amino groups may be either substituted or unsubstituted.

(4) The ink composition as described in any of (1) to (3) above, wherein a content of the surfactant in the ink composition is from 0.05 to 50 g/l.

(5) The ink composition as described in any of (1) to (4) above, wherein the surfactant is a nonionic surfactant.

(6) The ink composition as described in (5) above, wherein the nonionic surfactant is an acetylene glycol-base surfactant.

(7) The ink composition as described in any of (1) to (6) above, wherein the coloring agent is a phthalocyanine dye.

(8) The ink composition as described in any of (1) to (7) above, wherein the coloring agent is a dye represented by formula (2):

Formula (2):

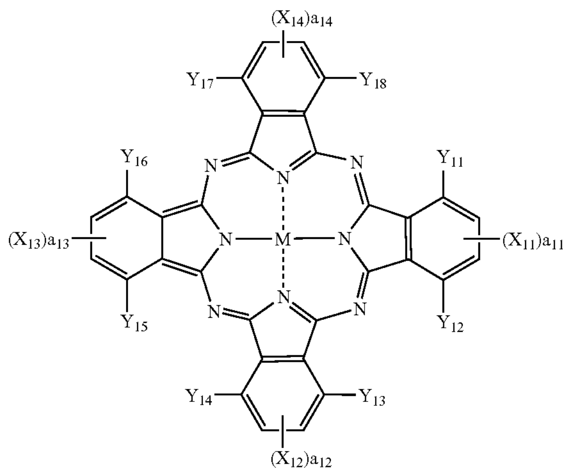

wherein $X_{11}$, $X_{12}$, $X_{13}$ and $X_{14}$ each independently represents —SO-Z, —$SO_2$-Z, —$SO_2NR_{11}R_{12}$, a sulfo group, —$CONR_{11}R_{12}$ or —$CO_2R_{11}$;

Z's each independently represents an alkyl group, an alkenyl group, an aralkyl group, an aryl group or a heterocyclic group, which may be further substituted by a substituent;

$R_{11}$ and $R_{12}$ each independently represents a hydrogen atom, an alkyl group, an alkenyl group, an aralkyl group, an aryl group or a heterocyclic group, which may be further substituted by a substituent;

$Y_{11}$, $Y_{12}$, $Y_{13}$, $Y_{14}$, $Y_{15}$, $Y_{16}$, $Y_{17}$ and $Y_{18}$ each independently represents a hydrogen atom or a monovalent substituent;

$a_{11}$ to $a_{14}$ respectively stand for the numbers of substituents in $X_{11}$ to $X_{14}$ and each independently represents an integer of 1 or 2; and M represents a hydrogen atom, or a metal atom or an oxide, a hydroxide or a halide of the metal atom.

(9) The ink composition as described in (8) above, wherein at least one of $X_{11}$ to $X_{14}$ represents a water-soluble group, and at least one of $X_{11}$ to $X_{14}$ other than the at least one of $X_{11}$ to $X_{14}$ representing the water-soluble group represents a hydrogen bond group.

(10) The ink composition as described in (9) above, wherein a group number ratio of the water-soluble group (x)/the hydrogen bond group (y) is $(0<x<3)/(1<y<4)$.

(11) The ink composition as described in (9) or (10) above, wherein the water-soluble group is $SO_2(CH_2)_3SO_3Li$ and the hydrogen bond group is $SO_2(CH_2)_3SO_2NHCH_2CH(CH_3)OH$.

(12) The ink composition as described in any of (1) to (11) above, which is utilized in inkjet recording.

(13) An inkjet recording method which comprises utilizing an ink composition as described in any of (1) to (12) above.

DETAILED DESCRIPTION OF THE INVENTION

According to the invention, it has been found out that, owing to the constitution of the ink composition essentially containing a guanidine compound and a surfactant, the penetration of the ink composition into media can be improved and the fastness to ozone of the coloring agent can be remarkably improved. Furthermore, the invention ensures an improvement in the fastness to ozone of the coloring agent and high image qualities free from bleeding or beading.

According to the invention, it has been also found out that the combined use of a cyan dye having a specific structure represented by the general formula (2) as the coloring agent with the guanidine compound and the surfactant can further enhance the above-described effects.

It has been moreover found out that the fastness to ozone as described above can be further improved by specifying the type and substitution position of a substituent in a phthalocyanine dye.

That is to say, the phthalocyanine dye according to the invention represented by the general formula (2) is largely characterized by having a substituent exclusively at the β-position in the benzene ring of the phthalocyanine skeleton by regulating the position of the substituent in the course of synthesizing the molecule.

In usual, a phthalocyanine dye has substituents such as a water-soluble group at random at the α- and β-positions in the benzene ring of the phthalocyanine skeleton.

As stated above, the phthalocyanine dye according to the invention has a substituent exclusively at the β-position. Owing to this structure, it appears that the phthalocyanine dye undergoes aggregation so as to establish an excellent weatherability (fastness to light, fastness to gas).

By adding a guanidine compound, the fastness to gas (fastness to ozone) of a printed image is remarkably improved. However, it is feared that penetration of the ink into an image-receiving paper would be worsened thereby.

This is because, in the step of the penetration of ink droplets into an image-receiving paper, the additive compound would undergo sedimentation so as to interfere the penetration of the ink. This phenomenon can be effectively prevented by adding a surfactant to the ink. By the addition of the surfactant to the ink, the wettability of the ink on the image-receiving paper is elevated and thus the penetration of the ink is improved. In the case where the added compound is sedimented, moreover, the sediment is quickly solubilized by the surfactant without exerting any undesirable effect on the penetration.

Next, the invention will be described in greater detail.

(Guanidine Compound)

The guanidine compound to be used in the invention means a compound having the N—C(=N)—N structure.

As the guanidine compound, a compound represented by the general formula (1) is preferred.

Formula (1)

$$\begin{array}{c} \quad R_5 \\ \quad | \\ R_1 \quad N \quad R_3 \\ \ \ \backslash \quad \| \quad / \\ N—C—N \\ \ \ / \qquad \backslash \\ R_2 \qquad R_4 \end{array}$$

wherein $R_1$, $R_2$, $R_3$ and $R_4$ each independently represents a hydrogen atom, an alkyl group, an alkoxy group, an aryl group, a heterocyclic group or an amino group; and $R_5$ represents a hydrogen atom, an alkyl group, an alkoxy group, an aryl group or a heterocyclic group, provided that these alkyl, alkoxy, aryl, heterocyclic and amino groups may be either substituted or unsubstituted.

As the alkyl group, those having from 1 to 12 carbon atoms, still preferably from 1 to 6 carbon atoms, are preferable.

As the aryl group, those having from 6 to 18 carbon atoms, still preferably from 6 to 10 carbon atoms, are preferable.

Examples of the heterocyclic group include furyl group, pyridyl group, pyrimidyl group, pyrrolyl group, pyrrolinyl group, pyrrolidyl group, dioxolyl group, pyrazolyl group, pyrazolinyl group, pyrazolidyl group, imidazolyl group, oxazolyl group, thiazolyl group, oxadiazolyl group, triazolyl group, thiadiazolyl group, pyryl group, pyridyl group, piperidyl group, dioxanyl group, morpholyl group, pyridazyl group, pyrazyl group, piperazyl group, triazyl group, trithianyl group and so on.

The term "alkyl group" used in the present specification means a monovalent saturated hydrocarbon group of the linear, branched or cyclic (which may be either monocyclic or polycyclic, and crosslinked or spiro in the case of a polycyclic group) type or a combination thereof. Namely, it means a concept involving cycloalkyl groups, cycloalkylalkyl groups and so on. In the case where it may be substituted by a substituent, substituted alkyl groups also fall within the category thereof.

The term "substituted alkyl group" as used in the present specification means an alkyl group in which a hydrogen atom of an alkyl group has been substituted by another substituent. Each substituent may have one or more substituents. The same applies to other groups such as a substituted aryl group.

The alkyl, alkoxy, aryl or heterocyclic groups represented by $R_1$ to $R_5$ include those wherein a hydrogen atom has been substituted by an arbitrary substituent. Examples of the substituent include halogen atoms such as chlorine, a nitro group, amino group, carboxyl group, hydroxyl group, carbamoyl group, amidino group, guanidino group, aryloxy groups (wherein the aryl moiety may be further substituted by such a substituent as cited herein) and so on. A single molecule may be substituted by two or more types of these substituents. In the above-described amino group, carbamoyl group, amidino group or guanidino group, a hydrogen atom may be further substituted by an alkyl group, an alkoxy group, an aryl group or a heterocyclic group represented by $R_1$ to $R_5$ as described above.

In the amino group represented by $R_1$ to $R_4$, a hydrogen atom may be substituted by an alkyl group, an alkoxy group, an aryl group or a heterocyclic group, etc. represented by $R_1$ to $R_5$ as described above.

The guanidine compound may be in the form of a salt or a metal salt. Examples thereof include a hydrochloride, a nitrate, a phosphate, a sulfamate, a carbonate, an acetate and so on.

Now, examples of the guanidine compound will be presented. Either one of these compounds or a combination thereof may be used, though the invention is not restricted thereto.

$H_2N—C(=NH)—NH_2$, $H_2N—C(=NH)—NH—NH_2$,

HOOC(H₂N)CH—(CH₂)₃—NH—C(=NH)—NH₂

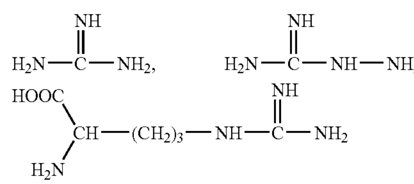

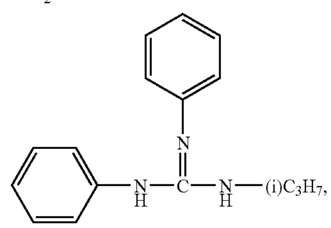

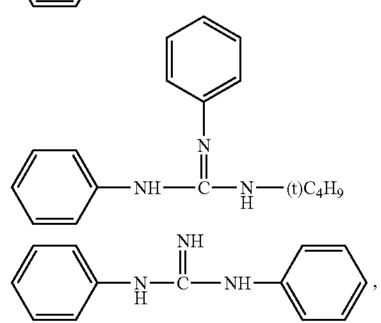

-continued

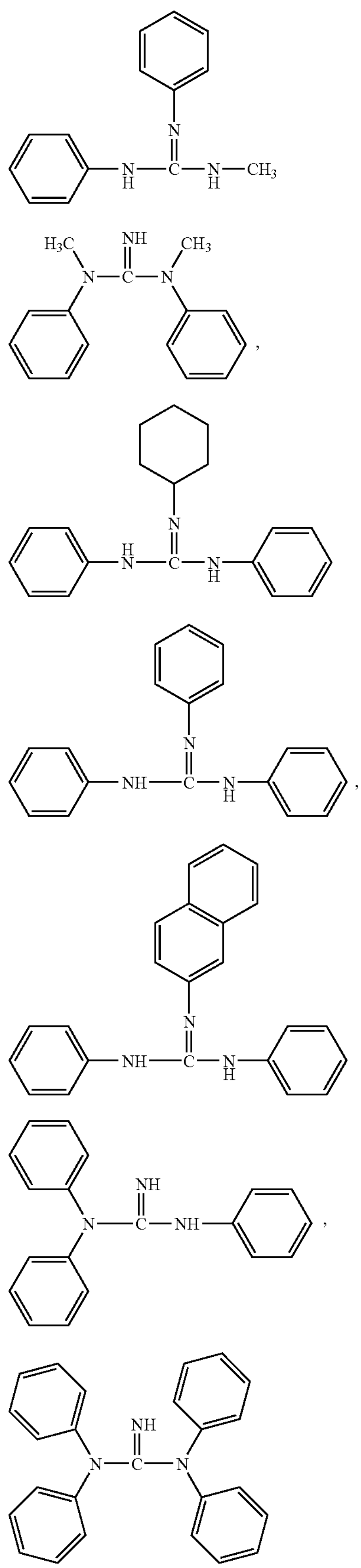

-continued

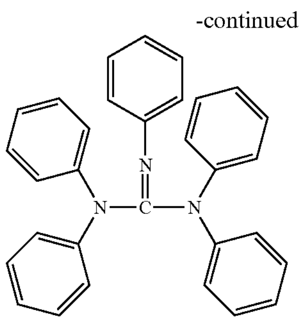

A compound represented by the general formula (1) can be synthesized by, for example, a method at least involving the step of treating a corresponding imino ether hydrochloride with ammonia.

The guanidine compound may be a polymer having the N—C(═N)—N structure. Examples of such a polymer include compounds having the repeating units represented by the general formulae (1-Aa), (1-Ab) and (1-Ac), though the invention is not restricted thereto. A compound having such a repeating unit may be an oligomer. A compound having the repeating unit represented by the general formula (1-Ac) may be a monomer. It is preferable to use such a compound in the form of a salt with an acid.

Formula (1-Aa):

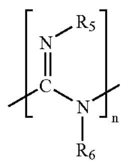

In the general formula (1-Aa), $R_5$ has the same meaning as defined above. $R_6$ represents any of $R_1$, $R_2$, $R_3$ and $R_4$ and n $R_5$'s and $R_6$'s may be either the same or different. n is an integer of 2 or above, preferably from 2 to 30 and still preferably from 2 to 15. A compound represented by the general formula (1-Aa) may be either a homopolymer or a copolymer with another repeating unit, for example, azetidinium. Although the terminal structure may be appropriately designed, a hydrogen atom, an alkyl group, an alkoxy group, an aryl group, a heterocyclic group or an amino group is preferable therefor.

Formula (1-Ab):

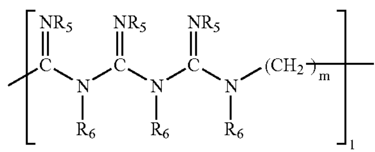

In the general formula (1-Ab), $R_5$ and $R_6$ each has the same meaning as defined above. l $R_5$'s and $R_6$'s may be either the same or different. l is an integer of 2 or above, preferably from 2 to 10 and still preferably from 2 to 5. m is an integer of 1 or above, preferably from 1 to 6 and still preferably from 1 to 3. A compound represented by the general formula (1-Ab) may be either a homopolymer or a copolymer with another repeating unit, for example, azetidinium. Although the terminal structure may be appropriately designed, a hydrogen atom, an alkyl group, an alkoxy group, an aryl group, a heterocyclic group or an amino group is preferable therefor.

Formula (1-Ac):

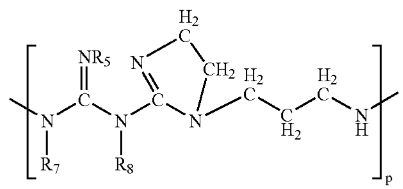

In the general formula (1-Ac), $R_5$ has the same meaning as defined above, $R_7$ has the same meaning as $R_1$ or $R_2$, and $R_8$ has the same meaning as $R_4$ or $R_5$. p $R_3$'s, $R_7$'s and $R_8$'s may be either the same or different. p is an integer of 1 or above, preferably from 1 to 10 and still preferably from 1 to 5. A compound represented by the general formula (1-Ac) may be either a homopolymer or a copolymer with another repeating unit, for example, azetidinium. Although the terminal structure may be appropriately designed, a hydrogen atom, an alkyl group, an alkoxy group, an aryl group, a heterocyclic group or an amino group is preferable therefor.

It is preferable to add at least one guanidine compound in a total amount of from 0.1 to 10% by mass in the ink composition. (In this specification, % by mass is equal to % by weight.)

(Surfactant)

The surfactant contained in the ink composition according to the invention can control the liquid properties (surface tension, etc.) of the ink to thereby establish excellent effects of, for example, improving the jetting stability and penetration into media of the ink, improving the waterproofness of an image and preventing a print from ink bleeding.

Examples of the surfactant include anionic surfactants such as fatty acid salts, alkyl sulfate ester salts, alkyl benzenesulfonates, alkyl napthalenesulfonates, dialkyl sulfosuccinates, alkyl phosphate ester salts, naphthalanesulfonic acid/formalin condensation products and polyoxyethylene alkylsulfate ester salts, cationic surfactants such as aliphatic amines, quaternary ammonium salts and alkyl pyridinium salts, nonionic surfactants such as polyoxyethylene alkyl ethers, polyoxyethylene alkyl allyl ethers, polyoxyethylene fatty acid esters, sorbitan fatty acid esters, polyoxyethylene sorbitan fatty acid esters, polyoxyethylene alkylamines, glycerol fatty acid esters, oxyethylene oxypropylene block copolymer and acetylene-base polyoxyethylene oxide, amphoteric surfactants such as amino acid type and betaine type surfactants, fluorine-base surfactants and silicone compounds. Either one of these surfactants or a mixture of two or more thereof may be used.

From the viewpoints of the effects as stated above as well as inkjet stability and penetration into paper, it is favorable to employ a nonionic surfactant. It is still preferable to use a compound represented by the following general formula (I), (II) or (III).

Although mono- or dialkyl ethers of polyhydric alcohols (for example, triethylene glycol monobutyl ether, triethylene glycol monomethyl ether, diethylene glycol monobutyl ether, diethylene glycol monoethyl ether, diethylene glycol diethyl ether, diethylene glycol dimethyl ether and so on) have surface-active ability, these compounds are regarded not as surfactants but as penetration promoters in the invention.

First, compounds represented by the general formula (I) will be illustrated.

Formula (I)

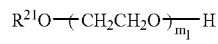

In the general formula (I), $R^{21}$ represents an alkyl group having from 5 to 40 carbon atoms, preferably from 8 to 18 carbon atoms. It may be either linear or branched and it may be substituted.

Examples of a group usable as a substituent of the alkyl group represented by $R^{21}$ include aryl groups (for example, phenyl, o-tolyl, p-tolyl and p-t-butylphenyl), alkoxy groups (for example, methoxy, ethoxy and n-butoxy), halogen atoms (for example, chlorine atom and bromine atom) and so on.

Specific examples of the alkyl group represented by $R^{21}$ include n-pentyl, n-hexyl, n-octyl, n-decyl, n-dodecyl, n-pentadecyl, n-octadecyl, 2-ethylhexyl, 1-ethylpentyl, 1-n-butylpentyl, 1-n-pentylhexyl, 1-n-hexylheptyl, 1-n-heptyloctyl, 1-n-octylnonyl, 6-metoxyhexyl, 2-phenylethyl and so on.

$m_1$ stands for the average number of ethylene oxide moles added which ranges from 2 to 40, preferably from 3 to 30 and still preferably from 3 to 20.

Among the compounds represented by the general formula (I), those represented by the following general formula (I-1) are particularly preferred.

Formula (I-1)

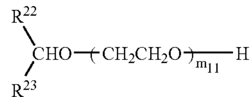

In the general formula (I-1), $R^{22}$ and $R^{23}$ each independently represents a saturated hydrocarbon having form 4 to 10 carbon atoms, provided that the sum of the carbon atoms in $R^{22}$ and $R^{23}$ ranges from 8 to 18. $m_{11}$ stands for the average number of ethylene oxide moles added which ranges from 3 to 20. Examples of the saturated hydrocarbons having from 4 to 10 carbon atoms represented by $R^{22}$ and $R^{23}$ include n-butyl, i-butyl, n-pentyl, n-hexyl, n-heptyl, n-octyl, 2-ethylhexyl, n-nonyl, n-decyl and so on. The sum of the carbon atoms in $R^{22}$ and $R^{23}$ ranges from 8 to 18, preferably from 8 to 16. $m_{11}$ ranges from 3 to 20, preferably from 5 to 20 and still preferably from 6 to 18.

Now, specific examples of the compounds represented by the general formula (I) will be presented, though the invention is not restricted thereto.

W1-1,2

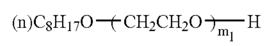

W1-1: $m_1 = 5$
W1-2: $m_1 = 10$

-continued

W1-3,4

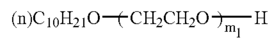

W1-3: $m_1 = 10$
W1-4: $m_1 = 15$

W1-5~7

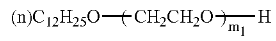

W1-5: $m_1 = 10$
W1-6: $m_1 = 15$
W1-7: $m_1 = 20$

W1-8

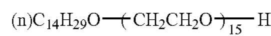

W1-9

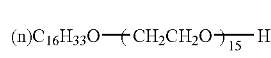

W1-10,11

$$C_{18}H_{35}O \leftarrow CH_2CH_2O \rightarrow_{m_1} H$$

W1-10: $m_1 = 12$
W1-11: $m_1 = 25$

W1-12

$$C_{18}H_{37}O \leftarrow CH_2CH_2O \rightarrow_{20} H$$

Specific examples of the compounds represented by the general formula (I-1) will be listed in the following Table 1, though the invention is not restricted thereto.

TABLE 1

| No. | $R^{22}$ | $R^{23}$ | $m_{11}$ |
|---|---|---|---|
| W1-13 | $(n)C_4H_9$ | $(n)C_4H_9$ | 3 |
| W1-14 | $(i)C_4H_9$ | $(i)C_4H_9$ | 5 |
| W1-15 | $(i)C_4H_9$ | $(i)C_4H_9$ | 9.5 |
| W1-16 | $(i)C_4H_9$ | $(i)C_4H_9$ | 11.4 |
| W1-17 | $(n)C_5H_{11}$ | $(n)C_5H_{11}$ | 8 |
| W1-18 | $(n)C_5H_{11}$ | $(n)C_5H_{11}$ | 10 |
| W1-19 | $(n)C_5H_{11}$ | $(n)C_5H_{11}$ | 11.4 |
| W1-20 | $(n)C_5H_{11}$ | $(n)C_5H_{11}$ | 13.5 |
| W1-21 | $(n)C_5H_{11}$ | $(n)C_6H_{13}$ | 15 |
| W1-22 | $(n)C_6H_{13}$ | $(n)C_6H_{13}$ | 10 |
| W1-23 | $(n)C_6H_{13}$ | $(n)C_6H_{13}$ | 13.6 |
| W1-24 | $(n)C_6H_{13}$ | $(n)C_6H_{13}$ | 15.8 |
| W1-25 | $(n)C_6H_{13}$ | $(n)C_7H_{15}$ | 16 |
| W1-26 | $(n)C_7H_{15}$ | $(n)C_7H_{15}$ | 15 |
| W1-27 | $(n)C_7H_{15}$ | $(n)C_7H_{15}$ | 16.5 |
| W1-28 | $(n)C_8H_{17}$ | $(n)C_8H_{17}$ | 14 |
| W1-29 | $(n)C_8H_{17}$ | $(n)C_8H_{17}$ | 17.6 |
| W1-30 | $(n)C_8H_{17}$ | $(n)C_{10}H_{21}$ | 20 |

Next, compounds represented by the general formula (II) will be illustrated.

Formula (II)

$$R^{24}COO \leftarrow CH_2CH_2O \rightarrow_{m_2} H$$

In the general formula (II), $R^{24}$ represents an alkyl group having from 5 to 40 carbon atoms, preferably from 5 to 30 carbon atoms. It may be either linear or branched and it may be substituted.

Examples of a group usable as a substituent of the alkyl group represented by $R^{24}$ include aryl groups (for example, phenyl, o-tolyl, p-tolyl and p-t-butylphenyl), alkoxy groups (for example, methoxy, ethoxy and n-butoxy), halogen atoms (for example, chlorine atom and bromine atom) and so on.

Specific examples of the alkyl group represented by $R^{24}$ include n-pentyl, n-hexyl, n-octyl, n-decyl, n-dodecyl, n-pentadecyl, n-octadecyl, 2-ethylhexyl, 1-ethylpentyl, 1-n-butylheptyl, 1-n-hexylnonyl, 1-n-heptyldecyl, 1-n-octyldodecyl, 1-n-decyltetradecyl, 6-metoxyhexyl, 2-phenylethyl and so on.

$m_2$ stands for the average number of ethylene oxide moles added which ranges from 2 to 40, preferably from 3 to 30 and still preferably from 4 to 20.

Among the compounds represented by the general formula (II), those represented by the following general formula (II-1) are particularly preferred.

Formula (II-1)

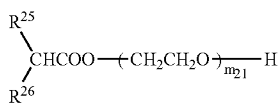

In the general formula (II-1), $R^{25}$ and $R^{26}$ each independently represents a saturated hydrocarbon having form 2 to 20 carbon atoms, preferably from 4 to 13 carbon atoms. Examples of the saturated hydrocarbons having form 2 to 20 carbon atoms represented by $R^{25}$ and $R^{26}$ include n-butyl, i-butyl, n-pentyl, n-hexyl, n-heptyl, n-octyl, 2-ethylhexyl, n-nonyl, n-decyl, n-dodecyl, n-hexadecyl, n-octadecyl and so on. $m^{21}$ stands for the average number of ethylene oxide moles added which ranges from 2 to 40, preferably from 3 to 30.

Now, specific examples of the compounds represented by the general formula (II) will be presented, though the invention is not restricted thereto.

W2-1,2

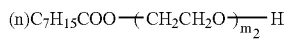

W2-1: $m_2 = 10$
W2-2: $m_2 = 15$

W2-3~5

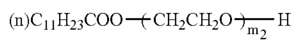

W2-3: $m_2 = 10$
W2-4: $m_2 = 15$
W2-5: $m_2 = 20$

W2-6~7

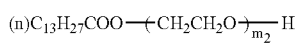

W2-6: $m_2 = 10$
W2-7: $m_2 = 15$

W2-8,9

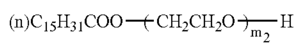

W2-8: $m_2 = 10$
W2-9: $m_2 = 15$

W2-10

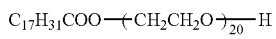

W2-11

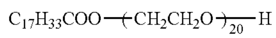

W2-12

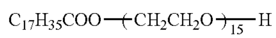

Examples of the compounds represented by the general formula (II-1) include one-terminal esters of polyethylene oxide 2-butyloctanoate and polyethylene oxide adduct of undecan-6-ol. Specific examples of the compounds represented by the general formula (II-1) will be listed in the following Table 2, though the invention is not restricted thereto.

TABLE 2

| No. | $R^{25}$ | $R^{26}$ | $m_{21}$ |
|---|---|---|---|
| W2-13 | $C_2H_5$ | $C_4H_9$ | 3 |
| W2-14 | $C_2H_5$ | $C_4H_9$ | 5 |
| W2-15 | $C_4H_9$ | $C_6H_{13}$ | 9.5 |
| W2-16 | $C_6H_{13}$ | $C_8H_{17}$ | 5 |
| W2-17 | $C_6H_{13}$ | $C_8H_{17}$ | 8 |
| W2-18 | $C_6H_{13}$ | $C_8H_{17}$ | 10 |
| W2-19 | $C_6H_{13}$ | $C_8H_{17}$ | 11.4 |
| W2-20 | $C_6H_{13}$ | $C_8H_{17}$ | 12.5 |
| W2-21 | $C_6H_{13}$ | $C_8H_{17}$ | 15 |
| W2-22 | $C_6H_{13}$ | $C_8H_{17}$ | 25 |
| W2-23 | $C_7H_{15}$ | $C_9H_{19}$ | 14 |
| W2-24 | $C_7H_{15}$ | $C_9H_{19}$ | 15 |
| W2-25 | $C_7H_{15}$ | $C_9H_{19}$ | 20 |
| W2-26 | $C_7H_{15}$ | $C_9H_{19}$ | 25 |
| W2-27 | $C_8H_{17}$ | $C_{10}H_{21}$ | 30 |
| W2-28 | $C_{10}H_{21}$ | $C_{12}H_{25}$ | 20 |
| W2-29 | $C_{10}H_{21}$ | $C_{12}H_{25}$ | 25 |
| W2-30 | $C_{10}H_{21}$ | $C_{13}H_{27}$ | 20 |
| W2-31 | $C_{10}H_{21}$ | $C_{13}H_{27}$ | 25 |
| W2-32 | $C_{10}H_{21}$ | $C_{13}H_{27}$ | 40 |

The compounds represented by the general formula (I) or (II) can be synthesized by using publicly known methods. For example, these compounds can be obtained by methods reported by Takehiko Fujimoto, Revised *Shin Kaimen Kasseizai Nyumon* (1992), p. 94 to 107.

Next, acetylene glycol-base surfactants represented by the general formula (III) will be illustrated.

Formula (III)

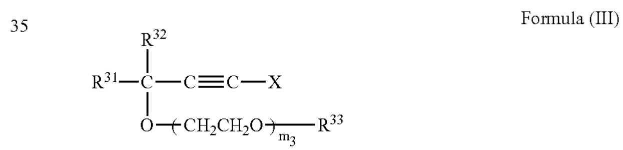

In the above formula, $R^{31}$ and $R^{32}$ each independently represents an alkyl group having from 1 to 18 carbon atoms.

More specifically speaking, $R^{31}$ and $R^{32}$ each independently represents an alkyl group having from 1 to 18 carbon atoms (for example, methyl, ethyl, n-propyl, butyl, hexyl, octyl, decyl, dodecyl and so on) which may be substituted. Examples of the substituent include alkyl groups (for example, methyl, ethyl, isopropyl and soon), alkoxy groups (for example, methoxy, ethoxy, and so on), halogen atoms (for example, chlorine atom and bromine atom) and so on. Among all, it is preferable that $R^{31}$ and $R^{32}$ are unsubstituted linear alkyl groups or unsubstituted branched alkyl groups having from 1 to 12 carbon atoms. Preferable examples thereof include methyl, ethyl, n-butyl, 2-methylbutyl, 2,4-dimethylpentyl and so on.

$R^{33}$ represents a hydrogen atom, an alkyl group having from 1 to 6 carbon atoms or a phenyl group and the alkyl or phenyl group may be substituted.

Examples of the substituent of the alkyl group $R^{33}$ include alkyl groups (for example, methyl, ethyl, isopropyl and so on), alkoxy groups (for example, methoxy, ethoxy and so on) and phenyl groups. Examples of the substituent of the phenyl group $R^{33}$ include alkyl groups (for example, methyl, ethyl, isopropyl and so on), alkoxy groups (for example, methoxy, ethoxy and so on), halogen atoms (for example, fluorine atom, chlorine atom and bromine atom) and so on.

Among all, it is preferable that $R^{33}$ is a hydrogen atom or an alkyl group having from 1 to 4 carbon atoms, still preferably a hydrogen atom.

X represents a hydrogen atom, or

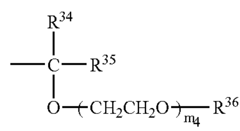

wherein $R^{34}$ and $R^{35}$ each independently represents an alkyl group having from 1 to 18 carbon atoms. Preferable substituents and specific examples of $R^{34}$ and $R^{35}$ are substituents and specific examples selected from those cited above concerning $R^{31}$ and $R^{32}$. $R^{36}$ represents a hydrogen atom, an alkyl group having from 1 to 6 carbon atoms or a phenyl group and preferable examples thereof are substituents and specific examples selected from those cited above concerning $R^{33}$.

$m^3$ and $m^4$ each independently represents the average number of ethylene oxide moles added, provided that $m^3+m^4$ ranges from 0 to 100, preferably from 0 to 50 and still preferably from 0 to 40.

In the case where $m^3$ is 0, $R^{33}$ represents a hydrogen atom. In the case where $m^4$ is 0, $R^{36}$ represents a hydrogen atom. In the case where X is a hydrogen atom, $m^3$ is from 1 to 100, preferably from 1 to 50 and still preferably from 1 to 40.

Among the compounds represented by the general formula (III), the compounds represented by the following general formula (III-1) are particularly preferred.

Formula (III-1)

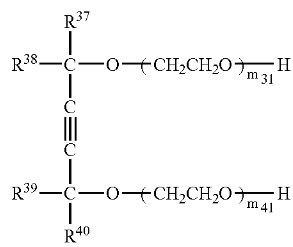

In the above formula, $R^{37}$, $R^{38}$, $R^{39}$ and $R^{40}$ each independently represents an alkyl group having from 1 to 6 carbon atoms, preferably form 1 to 4 carbon atoms. $m_{31}$ and $m_{41}$ independently represent each the average number of ethylene oxide moles added, provided that the sum thereof ranges from 0 to 40, preferably from 2 to 20.

Next, specific examples of the compounds represented by the general formula (III) or the general formula (III-1) will be presented, though the invention is not restricted thereto.

W5-1

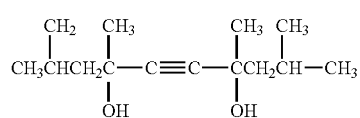

-continued

W5-2~6

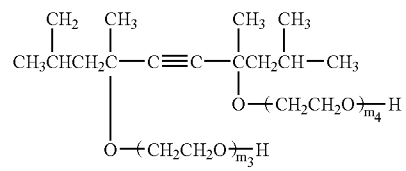

W5-2: $m_3 + m_4 = 1.3$
W5-3: $m_3 + m_4 = 3.5$
W5-4: $m_3 + m_4 = 10$
W5-5: $m_3 + m_4 = 20$
W5-6: $m_3 + m_4 = 30$

W5-7,8

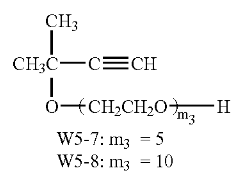

W5-7: $m_3 = 5$
W5-8: $m_3 = 10$

W5-9,10

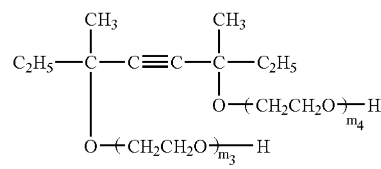

W5-9: $m_3 + m_4 = 3$
W5-10: $m_3 + m_4 = 10$

W5-11

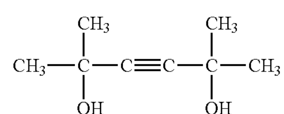

W5-12

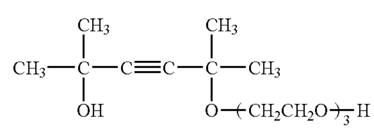

W5-13,14

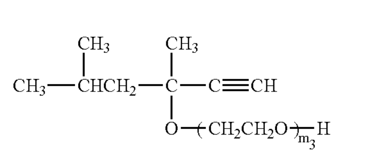

W5-13: $m_3 = 5$
W5-14: $m_3 = 10$

W5-15,16

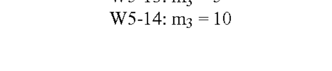

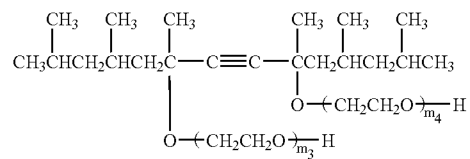

W5-15: $m_3 + m_4 = 8$
W5-16: $m_3 + m_4 = 20$

W5-17,18

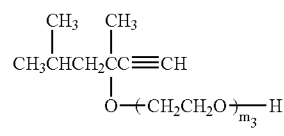

W5-17: $m_3 = 5$
W5-18: $m_3 = 10$

-continued

W5-19

W5-20

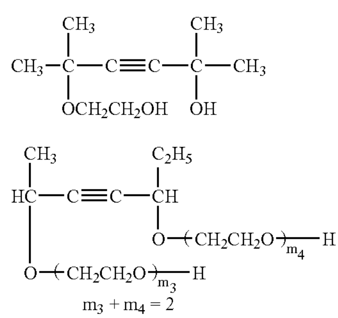

The compounds represented by the general formula (III) or the general formula (III-1) can be synthesized by using publicly known methods. For example, they can be obtained by methods reported by Takehiko Fujimoto, Revised *Shin Kaimen Kasseizai Nyumon* (1992), p. 94 to 107.

Alternatively, the compounds represented by the general formula (III) or the general formula (III-1) can be easily obtained as marketed products. Specific trade names thereof include Surfynols 61, 82, 104, 420, 440, 465, 485, 504, CT-111, CT-121, CT-131, CT-136, CT-141, CT-151, CT-171, CT-324, DF-37, DF-58, DF-75, DF-110D, DF-210, GA, OP-340, PSA-204, PSA-216, PSA-336, SE, SE-F and Dynol 604 (manufactured by Nisshin Chemical Industries and Air Products & Chemicals), Olfines A, B, AK-02, CT-151W, E1004, E1010, P, SPC, STG, Y and 32W (manufactured by Nisshin Chemical Industries) and so on.

Preferable examples of the compound represented by the general formula (III-1) include ethylene oxides adducts of acetylene diols (Surfinol Series, manufactured by Air Products & Chemicals) and acetylene diols, for example, 2,4,7,9-tetramethyl-5-decin-4,7-diol, 3,6-dimethyl-4-octin-3,6-diol, 2,5-dimethyl-3-hexin-2,5-diol and so on. Among all, it is preferable to use a compound having a molecular weight of from 200 to 1000, still preferably from 300 to 900 and particularly preferably from 400 to 900.

As the surfactant to be contained in the ink composition according to the invention, it is preferable to use one which scarcely undergoes sedimentation or separation from the ink and shows little foaming. From these viewpoints, it is preferable to use an anionic surfactant having a double-chain or branched hydrophobic moiety, an anionic or nonionic surfactant having a hydrophilic group around the center of a hydrophobic moiety, or a nonionic surfactant having a double-chain or branched hydrophobic moiety. Among all, a nonionic surfactant is preferred. Considering these points, it is preferable to employ a compound represented by the general formula (I-1) or the general formula (II-1) as a nonionic surfactant having a double-chain or branched hydrophobic moiety, or an acetylene glycol surfactant represented by the general formula (III-1) as a nonionic surfactant having a hydrophilic moiety around the center of a hydrophobic moiety.

Examples of the surfactant, moreover, polypropylene glycol ethylene oxide adducts may be cited. For example, compounds represented by the following general formula (IV) are preferred.

Formula (IV)

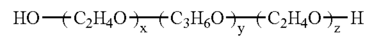

$$HO-(C_2H_4O)_x-(C_3H_6O)_y-(C_2H_4O)_z-H$$

In the above formula, x, y and z each represents an integer, and it is preferable that y is an integer of from 12 to 60 and x+z is an integer of from 5 to 25.

As examples of the compounds represented by the general formula (IV), citation may be made of Adeka Pluronic L61, Adeka Pluronic L62, Adeka Pluronic L63, Adeka Pluronic L64, Adeka Pluronic L42, Adeka Pluronic L43, Adeka Pluronic L44, Adeka Pluronic L31, Adeka Pluronic L34 (manufactured by Asahi Denka Co., Ltd.) and so on, though the invention is not restricted thereto.

The content of the surfactant in the ink composition according to the invention ranges from 0.05 to 50 g/L, preferably form 0.05 to 30 g/L and still preferably from 0.1 to 20 g/L. In the case where the content of the surfactant in the ink composition is less than 0.05 g/L, there arise lowering in inkjet stability, bleeding in color mixing, whiskering, etc. and thus the printing qualities are seriously worsened. In the case where the content of the surfactant in the ink composition exceeds 50 g/L, printing failures are sometimes caused by, for example, sticking of the ink to the hard face in the inkjet step.

In addition to the components as described above, it is preferable that the ink composition according to the invention contains one or more additives selected from the group consisting of a bleeding inhibitor, a defoaming agent, a bronze improving agent, an agent for improving fastness to ozone, a chelating agent, an anti-drying agent (a moistening agent), a penetration promoter, an UV absorber, an antioxidant, a viscosity controlling agent, a surface tension controlling agent, a dispersant, an anti-rusting agent and a pH controlling agent. The ink composition according to the invention may contain appropriately selected additives each in an appropriate amount. These additives include the above-described components and those each being capable of exhibiting one or more functions as a single component. In the composition ratio of each functional component, therefore, one having multiplicity of functions is independently handled as respective functional components.

[Coloring Agent]

The term coloring agent as employed herein is a concept involving dyes and pigments. Namely, the ink composition according to the invention can contain at least one of dyes and pigments. Either a dye or a pigment may be used alone. Alternatively, a dye and a pigment may be used together.

As the dye to be used in the ink composition according to the invention, various dyes are usable without particular restriction Namely, use can be made of various dyes commonly employed in the art, for example, direct dyes, indirect dyes, edible dyes, photographic dyes and so on. Now, specific examples thereof will be presented.

The ink composition according to the invention is usable not only in forming a monocolor image but also forming a full-color image. To form a full-color image, use can be made of a magenta color ink composition, a cyan color ink composition and a yellow color ink composition. It is also possible to use a black color ink composition. Use may be made of an ink set (preferably an ink set for inkjet recording) containing the ink composition according to the invention with the use of at least one of these ink compositions.

As a yellow dye, use can be made of an arbitrary one. Examples of the yellow dye include aryl or heteryl azo dyes having, for example, phenols, naphthols, anilines, heterocycles such as pyrazolones, pyridones or open-chain active methylene compounds as a coupling component (hereinafter referred to as a coupler component); azomethine dyes having, for example, open-chain active methylene compounds as a coupler component; methine dyes such as a benzylidene dye and a monomethine oxol dye; and quinone dyes such as a naphthoquinone dye and an anthraquinone dye. Examples of other dye species include quinophthalone dyes, nitronitroso dyes, acridine dyes and acridinone dyes.

As a magenta dye, use can be made of an arbitrary one. Examples of the magenta dye include aryl or heteryl azo dyes having, for example, phenols, naphthols or anilines, heterocycles such as pyrazine or open-chain active methylene compounds as a coupling component (hereinafter referred to as a coupler component); azomethine dyes having, for example, open-chain active methylene compounds as a coupling component; and anthrapyridone dyes.

As a cyan dye, use can be made of an arbitrary one. Examples of the cyan dye include aryl or heteryl azo dyes having, for example, phenols, naphthols or anilines as a coupler component; azomethine dyes having, for example, heterocycles such as phenols, naphthols or pyrolotriazole as a coupler component; polymethine dyes such as a cyanine dye, an oxonol dye and a merocyanine dye; carbonium dyes such as a diphenylmethane dye, a triphenylmethane dye and a xanthene dye; phthalocyanine dyes; anthraquinone dyes; and indigo-thioindigo dyes.

As a black dye, use can be made of an arbitrary one. Examples of the black dye include aryl or heteryl azo dyes having, for example, phenols, naphthols or anilines as a coupler component; azomethine dyes having, for example, phenols, naphthols or pyrolotriazole as a coupler component; polymethine dyes such as a cyanine dye, an oxonol dye and a merocyanine dye; carbonium dyes such as a diphenylmethane dye, a triphenylmethane dye and a xanthene dye; polychromophore dyes comprising combination thereof such as bisazo and trisazo dyes.

Such a dye may be one which would not develop a color (for example, yellow, cyan, etc.) until a part of its chromophore is dissociated. In this case, the counter ion may be either an inorganic cation such as an alkali metal or ammonium or an organic cation such as pyridinium or a quaternary ammonium salt. It may be a polymer cation having the same in its partial structure. The above-described polymer cation may be the polymer according to the invention or another one.

It is particularly preferable in the invention to use a dye having a heterocycle (also called a heterocyclic dye) which is excellent in resistance to light fading. As the heterocyclic dye, one having at least two aromatic heterocyclic rings is preferred. As the heterocyclic dye, it is also preferable to use a dye having a structure wherein the heterocycle contributes to the π-electron system controlling the color development by the dye. Among all, a dye having at least two heterocyclic groups in the π-electron system is most desirably usable. As the heterocyclic dye, azo dyes, phthalocyanine dyes, etc. are preferred.

An aromatic heterocyclic group means an aromatic ring having a heteroatom in 6π ((4n+2)π) system. Preferable examples thereof include pyridine, pyrazine, pyrimidine, pyridazine, triazine, pyrazole, imidazole, benzimidazole, triazole, thiazole, benzothiazole, isothiazole, benzisothiazole and thiadiazole groups as well as derivative groups thereof.

It is also preferable that the dye to be used in the ink composition according to the invention contains a dye having an oxidation potential of more electropositive than 1.0V (vs SCE). The more electropositive oxidation potential is the better. An oxidation potential of more electropositive than 1.10V (vs SCE) is still preferable and an oxidation potential of more electropositive than 1.15V (vs SCE) is most desirable. By using a combination of a dye having such an oxidation potential with the polymer according to the invention in the ink composition, fading with the passage of time is further lessened and image fastness (for example, stability with the passage of time, fastness to gas, fastness to light, fastness to heat, waterproofness, etc.) can be further improved.

In the invention, the oxidation potential level (Eox) can be easily measured by a person skilled in the art. Methods for measuring it are described in, for example, P. Delahay, *New Instrumental Methods in Electrochemistry* (1954, Interscience Publishers), A. J. Bard et al., *Electrochemical Methods* (1980, John Wiley & Sons), Akiya Fujishima et al., *Denki Kagaku Sokutei-ho* (1984, Gihodo Shuppan), etc.

More specifically speaking, the oxidation potential is determined by dissolving a test sample at a concentration of from $1\times10^{-2}$ to $1\times10^{-6}$ mol/l in a solvent such as dimethylformamide or acetonitrile containing a supporting electrolyte such as sodium perchlorate or tetrapropylammonium perchlorate and measuring as a value to SCE (Saturated Calomel Electrode) with the use of a cyclic voltammetry or the like. Although this value sometimes deviates about several 10 mV due to a potential difference between solutions or the solution resistance of the sample solution, the reproducibility of the potential can be assured by adding a standard (for example, hydroquinone).

To unambiguously define the potential, the oxidation potential of a dye is defined in the invention as a value (vs. SCE) measured in dimethylformamide containing 0.1 $moldm^{-3}$ of tetrapropylammonium perchlorate as a supporting electrolyte (dye concentration: 0.001 $moldm^{-3}$).

The Eox value stands for easiness of electron transfer from a sample to an electrode. A sample having a larger Eox (i.e., a more electropositive oxidation potential) has the less easiness of electron transfer toward an electrode, in other words, it is less oxidized. Concerning the structure of a compound, the oxidation potential becomes more electropositive by introducing an electron-withdrawing group but becomes more electronegative by introducing an electron-donating group. In the invention, it is desirable to achieve a more electropositive oxidation potential by introducing an electron-withdrawing group into the dye skeleton to thereby lower the reactivity with ozone which is an electrophile.

Examples of the dye having excellent fastness such as resistance to light fading to be used in the ink composition according to the invention include dyes reported in JP-A-2004-83609 and JP-A-2002-83610.

As the dye to be used in the invention, phthalocyanine dyes are preferable and dyes represented by the general formula (2) are still preferable.

(Dye Represented by the General Formula (2))

In the general formula (2), $X_{11}$, $X_{12}$, $X_{13}$ and $X_{14}$ each independently represents —SO-Z, —$SO_2$-Z, —$SO_2NR_{11}R_{12}$, a sulfo group, —$CONR_{11}R_{12}$ or —$CO_2R_{11}$. Among these substituents, —SO-Z, —$SO_2$-Z, —$SO_2NR_{11}R_{12}$ and —$CONR_{11}R_{12}$ are preferable, —$SO_2$-Z and —$SO_2NR_{11}R_{12}$ are particularly preferable, and —$SO_2$-Z is most desirable. A plural number of $X_{11}$'s, $X_{12}$'s, $X_{13}$'s or $X_{14}$'s may be either the same or different and each independently represents one of the above-described groups. All of $X_{11}$, $X_{12}$, $X_{13}$ and $X_{14}$ may be the same substituents.

Alternatively, $X_{11}$, $X_{12}$, $X_{13}$ and $X_{14}$ may be substituents of the same type but having different parts, for example, the case wherein $X_{11}$, $X_{12}$, $X_{13}$ and $X_{14}$ are all represented by —$SO_2$-Z but Z's differ from each other. It is also possible that $X_{11}$, $X_{12}$, $X_{13}$ and $X_{14}$ have different substituents, for example, the case of being substituted by —$SO_2$-Z and —$SO_2NR_{11}R_{12}$ at the same time.

Z's each independently represents an alkyl group, an alkenyl group, an aralkyl group, an aryl group or a heterocyclic group which may be further substituted by a substituent. Z preferably represents an alkyl group, an aryl group or a heterocyclic group and a substituted alkyl group, a substituted aryl group or a substituted heterocyclic group is still preferable. For improving the solubility of the dye and the stability of the ink, it is preferable that a substituent has an asymmetric carbon atom (being used as a racemate). For elevating association properties and improving fastness, it is preferable that a substituent has a hydroxyl group, an ether group, an ester group, a cyano group, an amido group or a sulfonamido group.

$R_{11}$ and $R_{12}$ each independently represents a hydrogen atom, an alkyl group, an alkenyl group, an aralkyl group, an aryl group or a heterocyclic group, which maybe further substituted by a substituent. It is preferable that $R_{11}$ and $R_{12}$ each independently represents a hydrogen atom, an alkyl group, an aryl group or a heterocyclic group, still preferably a hydrogen atom, a substituted alkyl group, a substituted aryl group or a substituted heterocyclic group. However, it is undesirable that $R_{11}$ and $R_{12}$ are both hydrogen atoms. For improving the solubility of the dye and the stability of the ink, it is preferable that a substituent has an asymmetric carbon atom (being used as a racemate). For elevating association properties and improving fastness, it is preferable that a substituent has a hydroxyl group, an ether group, an ester group, a cyano group, an amido group or a sulfonamido group.

The term "alkenyl group" used in the present specification means a monovalent saturated hydrocarbon group of the linear, branched or cyclic (which maybe either monocylic or polycyclic, and crosslinked or spiro in the case of a polycyclic group) type or a combination thereof having at least one carbon-carbon double bond excluding aromatic ones. In the case where it may be substituted by a substituent, substituted alkenyl groups also fall within the category thereof.

As the alkyl groups represented by $R_{11}$, $R_{12}$ and Z, alkyl groups having from 1 to 30 carbon atoms are preferable. For improving the solubility of the dye and the stability of the ink, branched alkyl groups are preferable and those having an asymmetric carbon atom (being used as a racemate) are still preferable. Examples of the substituents are the same as the substituents of Z, $R_{11}$, $R_{12}$ and $Y_{11}$ to $Y_{18}$, if any, as will be described hereinafter. Among all, a hydroxyl group, an ether group, an ester group, a cyano group, an amido group and a sulfonamido group are preferable for elevating the association properties of the dye and improving fastness. Furthermore, these groups may have a halogen atom or an ionic hydrophilic group.

As the alkenyl groups represented by $R_{11}$, $R_{12}$ and Z, alkenyl groups having from 1 to 30 carbon atoms are preferable. For improving the solubility of the dye and the stability of the ink, branched alkenyl groups are preferable and those having an asymmetric carbon atom (being used as a racemate) are still preferable. Examples of the substituents are the same as the substituents of Z, $R_{11}$, $R_{12}$ and $Y_{11}$ to $Y_{18}$, if any, as will be described hereinafter. Among all, a hydroxyl group, an ether group, an ester group, a cyano group, an amido group and a sulfonamido group are preferable for elevating the association properties of the dye and improving fastness. Furthermore, these groups may have a halogen atom or an ionic hydrophilic group.

As the aralkyl groups represented by $R_{11}$, $R_{12}$ and Z, aralkyl groups having from 7 to 30 carbon atoms are preferable. For improving the solubility of the dye and the stability of the ink, branched aralkyl groups are preferable and those having an asymmetric carbon atom (being used as a racemate) are still preferable. Examples of the substituents are the same as the substituents of Z, $R_{11}$, $R_{12}$ and $Y_{11}$ to $Y_{18}$, if any, as will be described hereinafter. Among all, a hydroxyl group, an ether group, an ester group, a cyano group, an amido group and a sulfonamido group are preferable for elevating the association properties of the dye and improving fastness. Furthermore, these groups may have a halogen atom or an ionic hydrophilic group.

As the aryl groups represented by $R_{11}$, $R_{12}$ and Z, alkyl groups having from 6 to 30 carbon atoms are preferable. Examples of the substituents are the same as the substituents of Z, $R_{11}$, $R_{12}$ and $Y_{11}$ to $Y_{18}$, if any, as will be described hereinafter. Among all, an electron-withdrawing group is particularly preferable, since it imparts an electropositive oxidation potential to the dye and improves the fastness. As specific examples of the electron-drawing dyes, those cited with respect to the magenta dye may be cited. Among all, halogen atoms, heterocyclic groups, cyano group, carboxyl group, acylamino group, sulfonamido group, sulfamoyl group, carbamoyl group, sulfonyl group, imido group, acyl group, sulfo group and quanternary ammonium group are preferable, and cyano group, carboxyl group, sulfamoyl group, carbamoyl group, sulfonyl group, imido group, acyl group, sulfo group and quanternary ammonium group are still preferable.

As the heterocyclic groups represented by $R_{11}$, $R_{12}$ and Z, 5- or 6-membered rings are preferable and these rings may be further fused. Either aromatic heterocyclic groups or non-aromatic heterocyclic groups are usable. Next, examples of the heterocyclic groups represented by $R_{11}$, $R_{12}$ and Z will be presented in the form of heterocycle without showing the substitution position(s). However, the substitution position(s) are not particularly restricted. In the case of pyrimidine, for example, substitution may be made at the 2-, 3- and/or 4-positions. Examples thereof include pyridine, pyrazine, pyrimidine, pyridazine, triazine, quinoline, isoquinoline, quinazoline, cinnoline, phthalazine, quinoxaline, pyrrole, indole, furan, benzofuran, thiophene, benzothiophene, pyrazole, imidazole, benzimidazole, triazole, oxazole, benzoxazole, thiazole, benzothiazole, isothiazole, benzisothiazole, thiadiazole, isoxazole, benzisoxazole, pyrrolidine, piperidine, piperazine, imidazolidine, thiazoline and so on. Among all, aromatic heterocyclic groups are preferred and preferable examples thereof include pyridine, pyrazine, pyrimidine, pyridazine, triazine, pyrazole, imidazole, benzimidazole, triazole, thiazole, benzothiazole, isothiazole, benzisothiazole and thiadiazole. These groups may further have substituents and examples of the substituents are the same as the substituents of Z, $R_{11}$, $R_{12}$ and $Y_{11}$ to $Y_{18}$, if any, as will be described hereinafter. Preferable examples of the substituents are the same as the preferable examples of the substituents of the aryl groups as described above, and still preferable examples of the substituents are the same as the still preferable examples of the substituents of the aryl groups as described above.

$Y_{11}$ to $Y_{18}$ each independently represents a hydrogen atom, a halogen atom, an alkyl group, an alkenyl group, an aralkyl group, an aryl group, a heterocyclic group, a cyano group, a hydroxyl group, a nitro group, an amino group, an alkylamino group, an alkoxy group, an aryloxy group, an acylamino group, an arylamino group, an ureido group, a sulfamoyl group, an alkylthio group, an arylthio group, an alkoxycarbonylamino group, a sufonamido group, a carbamoyl group, a sulfamoyl group, a sulfonyl group, an alkoxycarbonyl group, a heterocyclic oxy group, an azo group, an acyloxy group, a carbamoyloxy group, a silyloxy group, an aryloxycarbonyl group, an aryloxycarbonylamino group, an imido group, a heterocyclic thio group, a phosphoryl group, an acyl group, a carboxyl group or a sulfo group, which may be further substituted.

Among all, a hydrogen atom, a halogen atom, an alkyl group, an aryl group, a cyano group, an alkoxy group, an amido group, an ureido group, a sulfonamido group, a carbamoyl group, a sulfamoyl group, an alkoxycarbonyl group, a carboxyl group and a sulfo group are preferable, a hydrogen atom, a halogen atom, a cyano group, a carboxyl group and a sulfo group are still preferable, and a hydrogen atom is most desirable.

In the case where Z, $R_{11}$, $R_{12}$ and $Y_{11}$ to $Y_{18}$ may have substituent(s), these groups may have the following substituents.

Linear or branched alkyl groups having from 1 to 12 carbon atoms, linear or branched aralkyl groups having from 7 to 18 carbon atoms, liner or branched alkenyl groups having from 2 to 12 carbon atoms, linear or branched alkynyl groups having from 2 to 12 carbon atoms, linear or branched cycloalkyl groups having from 3 to 12 carbon atoms and linear or branched cycloalkenyl groups having from 3 to 12 carbon atoms (from the viewpoint of improving the solubility of the dye and the stability of the ink, branched groups are preferable and groups having an asymmetric carbon atom are still preferable; for example, methyl, ethyl, propyl, isopropyl, sec-butyl, t-butyl, 2-ethylhexyl, 2-methylsulfonylethyl, 3-phenoxypropyl, trifluoromethyl and cyclopentyl), halogen atoms (for example, chlorine atom and bromine atom), aryl groups (for example, phenyl, 4-t-butylphenyl and 2,4-di-t-amylphenyl), heterocyclic groups (for example, imidazolyl, pyrazolyl, triazolyl, 2-furyl, 2-thienyl, 2-pyrimidinyl and 2-benzothiazolyl), cyano group, hydroxyl group, nitro group, carboxy group, amino group, alkyloxy groups (for example, methoxy, ethoxy, 2-memthoxyethoxy and 2-methanesulfonylethoxy), aryloxy groups (for example, phenoxy, 2-methylphenoxy, 4-t-butylphenoxy, 3-nitrophenoxy, 3-t-butyloxycarbamoylphenoxy and 3-methoxycarbamoyl), acylamino groups (for example, acetamido and benzamido, 4-(3-t-butyl-4-hydroxyphenoxy)butanamido), alkylamino groups (for example, methylamino, butylamino, diethylamino and methylbutylamino), anilino groups (for example, phenylamino, and 2-chloroanilino), ureido groups (for example, phenylureido, methylureido and N-dibutylureido), sulfamoylamino groups (for example, N,N-dipropylsulfamoylamino), alkylthio groups (for example, methylthio, octylthio and 2-phenoxyethylthio), arylthio groups (for example, phenylthio, 2-butoxy-5-t-octylphenylthio and 2-carboxyphenylthio), alkyloxycarbonylamino groups (for example, methoxycarbonylamino), sulfonamido groups (for example, methanesulfonamido, benzenesulfonamido and p-toluenesulfonamido), carbamoyl groups (for example, N-ethylcarbamoyl and N,N-dibutylcarbamoyl), sulfamoyl groups (for example, N-ethylsulfamoyl and N,N-dipropylsulfamoyl, N-phenylsulfamoyl), sulfonyl groups (for example, methanesulfonyl, octanesulfonyl, benzenesulfonyl and toluenesulfonyl), alkyloxycarbonyl groups (for example, methoxycarboyl and butyloxycarbonyl), heterocyclic oxy groups (for example, 1-phenyltetrazol-5-oxy and 2-tetrahydropyranyloxy), azo groups (for example, phenylazo, 4-methoxyphenylazo, 4-pivaloylaminophenylazo and 2-hydroxy-4-propanoylphenylazo), acyloxy groups (for example, acetoxy), carbamoyloxy groups (for example, N-methylcarbamoyloxy and N-phenylcarbamyloxy), silyloxy groups (for example, trimethylsilyloxy and dibutylmethylsilyloxy), aryloxycarbonylamino groups (for example, phenoxycarbonylamino), imido groups (for example, N-succinimido and N-phthalimido), heterocyclic thio groups (for example, 2-benzothiazolylthio, 2,4-di-phenoxy-1,3,5-triazole-6-thio and 2-pyridylthio), sulfinyl groups (for example, 3-phenoxypropylsulfinyl), phosphonyl groups (for example, phenoxyphosphonyl, octyloxyphosphonyl and phenylphosphonyl), aryloxycarbonyl groups (for example, phenoxycarbonyl), acyl groups (for example, acetyl, 3-phenylpropanoyl and benzoyl), and ionic hydrophilic groups (for example, carboxyl, sulfo, phosphono and quaternary ammonium).

In the case where the phthalocyanine dye represented by the general formula (2) is soluble in water, it preferably has a water-soluble group.

$a_{11}$ to $a_{14}$ respectively stand for the numbers of substituents in $X_{11}$ to $X_{14}$ and each independently represents an integer of 1 or 2. It is preferable that $4 \leqq a_{11}+a_{12}+a_{13}+a_{14} \leqq 6$, still preferably $a_{11}=a_{12}=a_{13}=a_{14}=1$. It is also preferable that these substituents comprise a water-soluble group and a hydrogen bond group.

M represents a hydrogen atom, or a metal atom or its oxide, hydroxide or halide.

Preferable examples of M include a hydrogen atom, metal atoms such as Li, Na, K, Mg, Ti Zr, V, Nb, Ta, Cr, Mo, W, Mn, Fe, Co, Ni, Ru, Rh, Pd, Os, Ir, Pt, Cu, Ag, Au, Zn, Cd, Hg, Al, Ga, In, Si, Ge, Sn, Pb and Bi, oxides such as Vo and GeO, hydroxides such as $Si(OH)_2$, $Cr(OH)_2$ and $Sn(OH)_2$, and halides such as AlCl, $SiCl_2$, VCl, $VCl_2$, FeCl, GaCl and ZrCl.

Among all, Cu, Ni, Zn, Al, etc. are preferred and Cu is most desirable.

It is al possible that Pc (phthalocyanine) rings form a dimer (for example, Pc-M-L-M-Pc) or a trimer via L (a divalent linking group). In such a case, Ms may be either the same or different.

Preferable examples of the divalent linking group represented by L include an oxy group (—O—), a thio group (—S—), a carbonyl group (—CO—), a sulfonyl group (—$SO_2$—), an imino group (—NH—), a methylene group (—$CH_2$—) and groups comprising combination thereof.

Concerning preferable combination of the substituents in the compound represented by the above general formula (2), a compound in which at least one of the substituents is a preferable group as cited above is preferred, a compound in which a larger number of substituents are preferable groups as cited above is still preferred, and a compound in which all of the substituents are preferable groups as cited above is most desirable.

In the chemical structure of the phthalocyanine dye according to the invention, it is preferable to introduce at least one electron-withdrawing groups (for example, a sulfinyl group, a sulfonyl group or a sulfamoyl group) into each of the four benzene rings of phthalocyanine so as to give the sum of the Hammett's constants σp of the substituents in the whole phthalocyanine skeleton of 1.6 or above.

Now, Hammett's substituent constant σp will be illustrated. Hammett's rule, which is an empirical rule proposed in 1935 by L. P. Hammett for quantitatively discussing the effect of a substituent on a reaction or equilibrium of a benzene derivative, has been widely accepted as reasonable today. Substituent's constants determined by Hammett's rule include σp and σm. These parameters are generally reported in detail in a large number of publications, for example, J. A. Dean, *Lange's Handbook of Chemistry,* 12th ed., 1979 (Mc Graw-Hill) and *Kagaku no Ryoiki*, extra issue No. 122, pp. 96-103, 1979 (Nankodo).

It is generally unavoidable that the phthalocyanine derivative represented by the above general formula (2) occurs as a mixture of analogs differing in the introduction sites and number of the substituents Xn (n=11 to 14) and Ym (m=11 to 18) depending on the synthesis method. In the general formula (2), therefore, such an analog mixture is frequently represented in the statistically averaged state.

The phthalocyanine derivatives of the general formula (2) to be used in the invention can be synthesized by combining methods described or cited in, for example, Shirai and Kobayashi, *Futaroshianin Kagaku to Kino*, pp. 1-62 (IPC), C. C. Lezonff and A. B. P. Lever, *Phthalocyanines—Properties and Applications*, pp. 1-54 (VCH) and so on, or methods similar thereto.

The phthalocyanine compound according to the invention represented by the general formula (2) can be derived from a sulfophthalocyanine compound which is obtained by reacting a phthalonitrile compound (compound P) represented by the following formula and/or a diiminoisoindoline derivative (compound Q) with a metal derivative represented by the general formula (A) while controlling the mixing ratio of the compounds P and Q, or reacting them with a 4-sulfophthalonitrile derivative (compound R) with a metal derivative represented by the general formula (A) while controlling the mixing ratio.

Compound P

Compound Q

Compound R

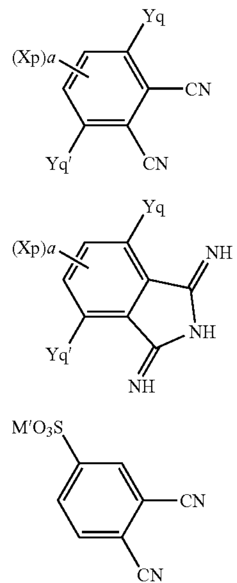

In the above formulae, Xp corresponds to $X_{11}$, $X_{12}$, $X_{13}$ or $X_{14}$ in the above-described general formula (2). Yq and Yq' correspond respectively to $Y_{11}$, $Y_{12}$, $Y_{13}$, $Y_{14}$, $Y_{15}$, $Y_{16}$, $Y_{17}$ or $Y_{18}$ in the general formula (2). In the compound R, M' represents a cation. As examples of the cation represented by M', citation may be made of alkali metal ions such as Li, Na and K and organic cations such as triethylammonium ion and pyridinium ion.

M-(Y)d    Formula (A)

In the general formula (A), M has the same meaning as M in the above general formula (2); Y represents a monovalent or divalent ligand such as a halogen atom, acetate anion, acetylacetonate or oxygen; and d is an integer of from 1 to 4.

According to the above-described synthesis method, therefore, a definite number of desired substituents can be exclusively introduced. In the case where it is intended to introduce a large number of electron-withdrawing groups to make oxidation potential electropositive and, in its turn, achieve a desired water-soluble group/hydrogen bond group ratio (the group number ratio) as in the invention, the above-described synthesis method is highly favorable.

The thus obtained phthalocyanine compound represented by the above-described general formula (2) usually occurs as a mixture of compounds represented by the following general formulae (a)-1 to (a)-4 which are isomers differing in the Xp substitution position, i.e., the β-position substitution type. $R_1$ to $R_4$ correspond respectively to $X_{11}$ to $X_{14}$.

Formula (a)-1

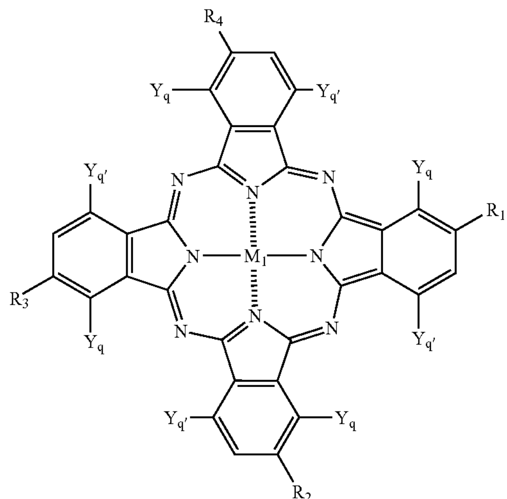

Formula (a)-2

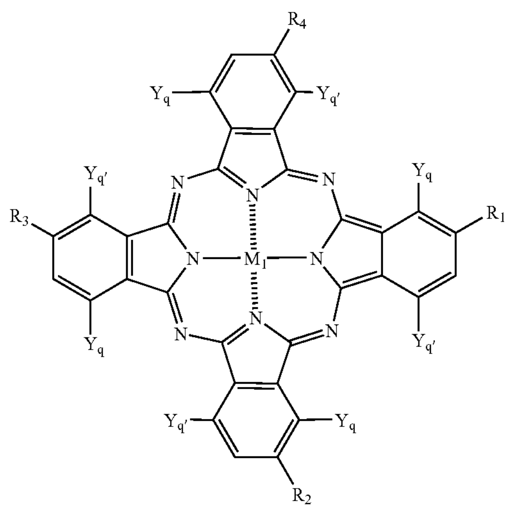

-continued

Formula (a)-3

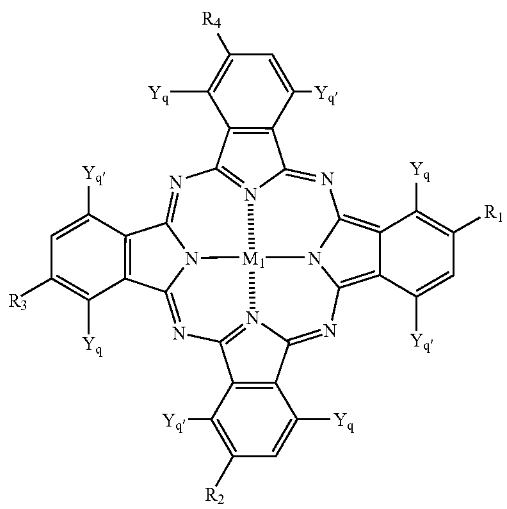

Formula (a)-4

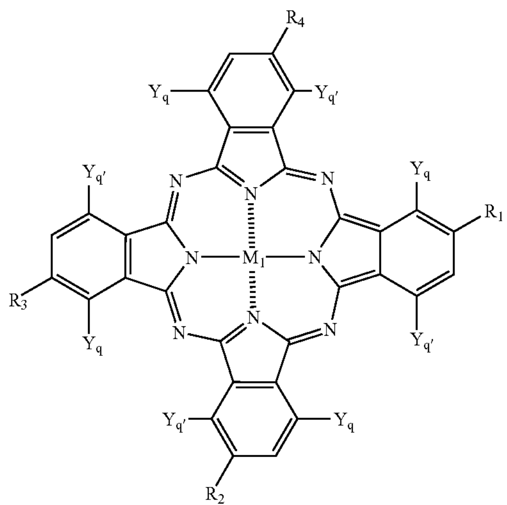

When Xp's which are all the same are used in the above synthesis method, a β-position substitution type phthalocyanine dye having the same substituents $X_{11}$, $X_{12}$, $X_{13}$ and $X_{14}$ at the β-position can be obtained. When different Xp's are used combinedly, a dye having substituents of the same type but differing in parts or a dye having substituents different from each other can be obtained. Among the dyes of the general formula (2), a dye having a specific water-soluble group/hydrogen bond group ratio (the group number ratio) is particularly preferable, since the solubility and association properties of the dye and ink stability with the passage of time, etc. can be controlled thereby.

Although the detailed reason therefor is still unknown, the phthalocyanine dyes of the β-position substitution type according to the invention are superior in color hue, light-fastness, ozone gas resistance, etc. to the phthalocyanine dyes of the α,β-mixed position substitution type (the α-positions correspond to $Y_{11}$ to $Y_{18}$). Among the phthalocyanine dyes of the β-position substitution type according to the invention, a dye having a specific water-soluble group/hydrogen bond group ratio (the group number ratio) is particularly superior in the above properties to the others.

The phthalocyanine dyes represented by the general formula (2) can be synthesized in accordance with methods reported by JP-A-2001-226275, JP-A-2001-96610, JP-A-2001-47013 and JP-A-2001-193638, though starting materials, intermediate dyes and synthesis routes are not restricted thereto.

In the general formula (2), it is preferable that at least one of $X_{11}$ to $X_{14}$ represents a water-soluble group, and at least one of $X_{11}$ to $X_{14}$ other than the at least one of $X_{11}$ to $X_{14}$ representing the water-soluble group represents a hydrogen bond group.

A water-soluble group means a group contributing to the solubility in water of the dye represented by the general formula (2) (hereinafter referred to as the dye (2)) and having at least one ionic hydrophilic group in its structure. The water-soluble group maybe either a group consisting of an ionic hydrophilic group alone or a group having an ionic hydrophilic group.

The ionic hydrophilic group includes, for example, a carboxyl group, a hydroxyl group on an aromatic ring including a hetero aromatic ring, a sulfo group, a phosphono group, a sulfonamido group and a quaternary ammonium group. Preferable examples of the ionic hydrophilic group include a carboxyl group, a hydroxyl group on an aromatic ring including a hetero aromatic ring, a sulfo group and a phosphono group. A carboxyl group, a hydroxyl group on an aromatic ring including a hetero aromatic ring and a sulfo group are still preferable. It is most desirable that at least one of them is a carboxyl group. A hydroxyl group on an aromatic ring including a hetero aromatic ring or a sulfonamido group is preferable because of having an effect of improving the storage stability of the dye in the ink.

A carboxyl group, a hydroxyl group on an aromatic ring including a hetero aromatic ring, a phosphono group, a sulfonamido group and a sulfo group may be in the state of a salt. Examples of the counter ion constituting such a salt include ammonium ion, alkali metal ions (for example, lithium ion, sodium ion and potassium ion) and organic cations (for example, tetramethylammonium ion, tetramethylguanidium ion and tetramethylphosphonium). Among these counter ions, alkali metal salts are preferred.

A hydrogen bond group means a group having at least a binding site (or a functional group) allowing the formation of a hydrogen bond between the dye (2) and the dye (2). It may have one or more binding sites per group. Examples of the binding site include a hydroxyl group, an amino group, an amide bond, an oxide bond and so on and a hydrogen bond is formed between the same or different species.

The hydrogen bond group may allow the formation of a hydrogen bond between the dye (2) and an additive as will be illustrated hereinafter.

In the case where the dye (2) has both of water-soluble group(s) and hydrogen bond group(s) per molecule, the numbers of individual groups may range from 1 to 7, provided that the sum thereof is 8. In the invention, it is preferable that the ratio water-soluble group (x)/hydrogen bond group (y) (the group number ratio) is $(0<x<3)/(1<y<4)$, still preferably $(1<x<3)/(1<y<3)$, and particularly preferably $(x=2)/(y=2)$. It is preferable that individual values in this group number ratio correspond as such to the number of the groups contained per molecule of the dye (1).

The group number ratio as described above may be a statistically averaged value of a large number of molecules of the dye (2). That is to say, a dye the average group number ratio all molecules of which falls within the range as specified above is involved in the scope of the invention, even though it has some molecules each having a group number ratio beyond the lower or upper limit. This group number ratio can be controlled by regulating the composition ratio of materials for synthesizing the dye (2) as will be discussed hereinafter. The group number ratio can be managed depending on the absorption spectral properties (λmax, ε, absorption wave shape) of the dye (2) in an aqueous solution.

Next, specific examples of the water-soluble group and the hydrogen bond group in the dye (2) will be presented.

Although particularly preferable examples of the water-soluble group and the hydrogen bond group will be presented hereinafter, the water-soluble group and the hydrogen bond group to be used in the invention are not restricted thereto.

Although each water-soluble group is presented in the free state, the water-soluble groups to be used in the invention may be in the form of salts. Examples of the counter ion constituting such a salt include ammonium ion, alkali metal ions (for example, lithium ion, sodium ion and potassium ion) and organic cations (for example, tetramethylammonium ion, tetramethylguanidium ion and tetramethylphosphonium). Among these counter ions, alkali metal salts are preferred.

Examples of the water-soluble group are as follows.

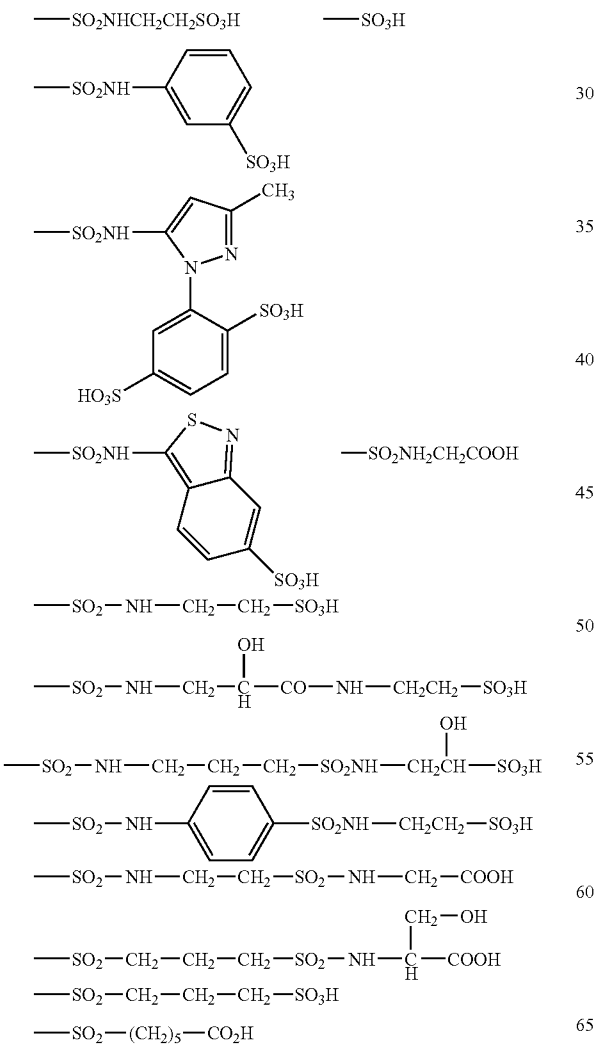

-continued

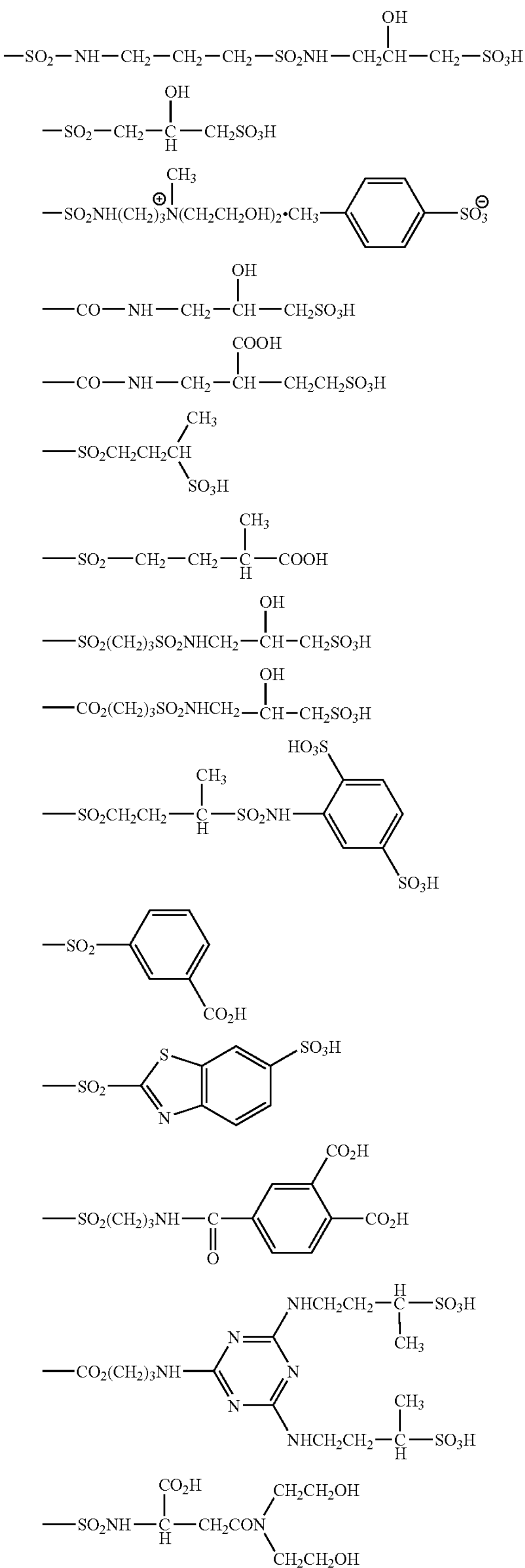

-continued
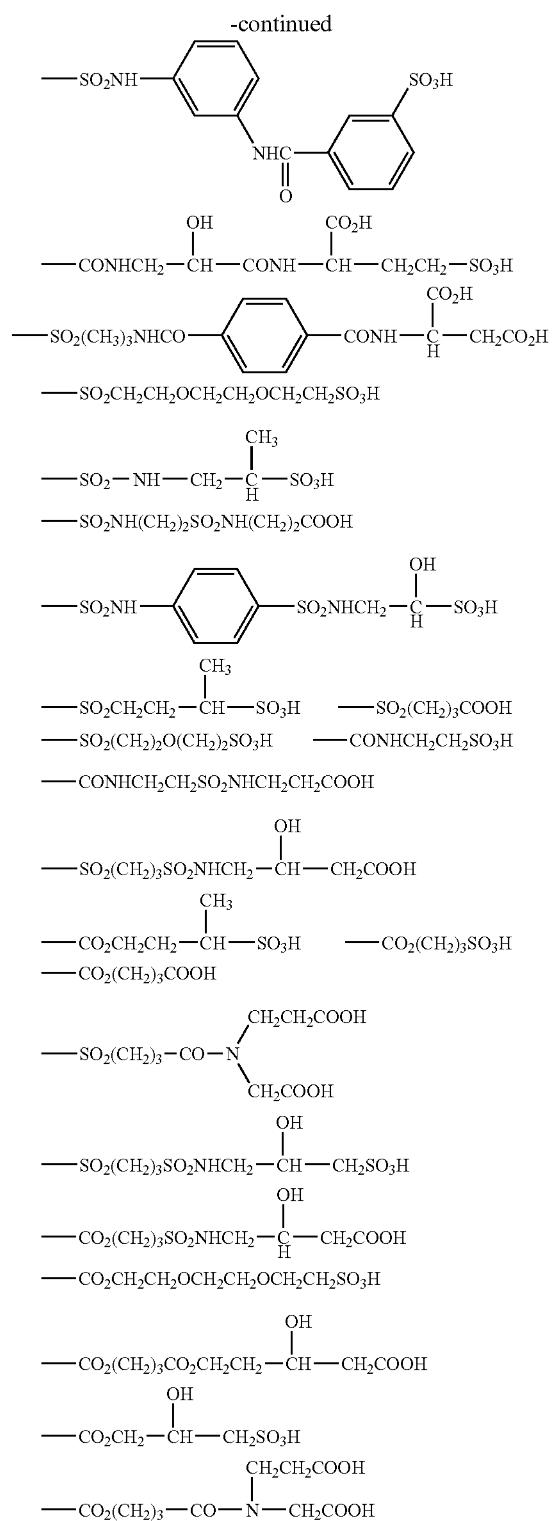
Examples of the hydrogen bond group are as follows.
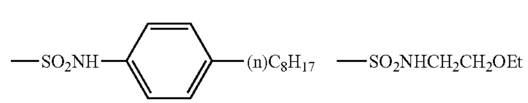
-continued
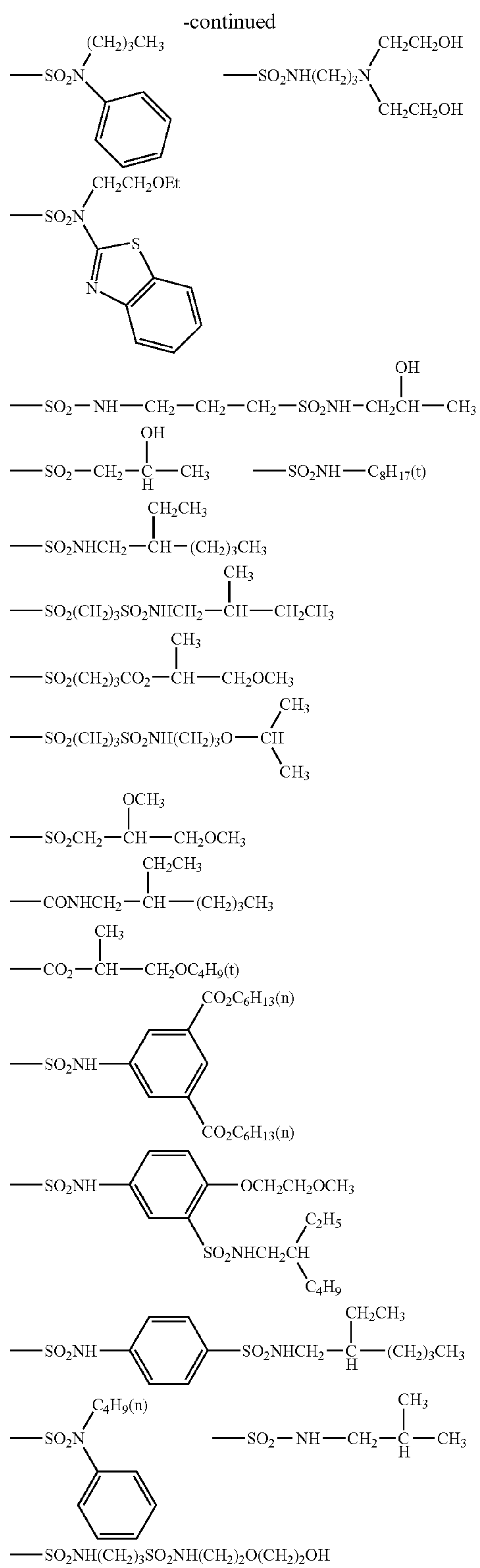

-continued

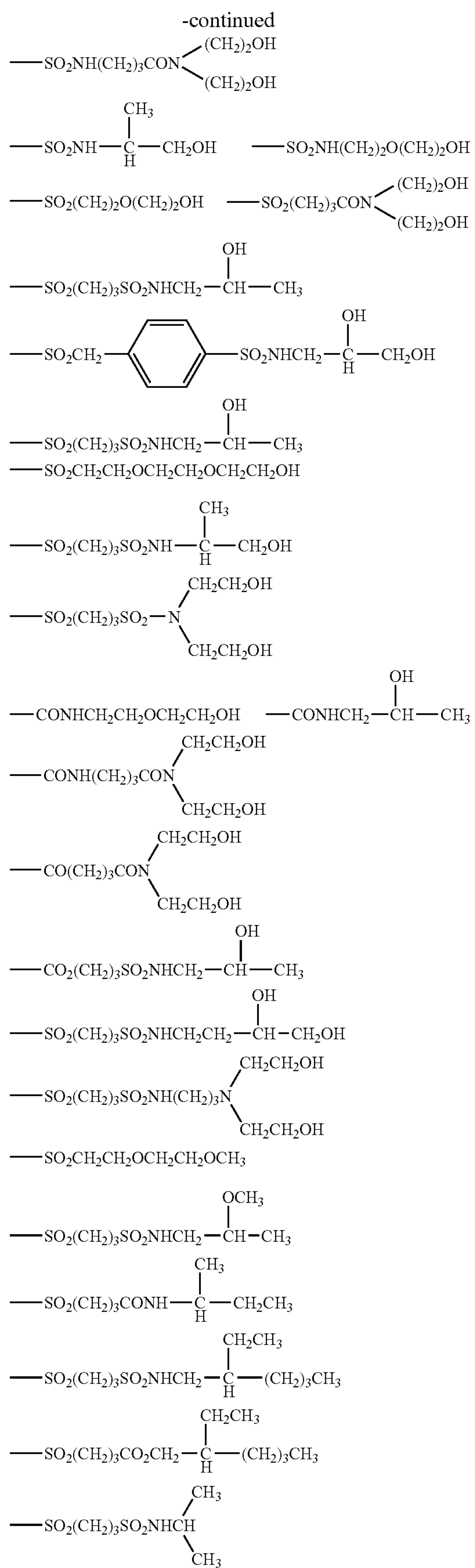

-continued

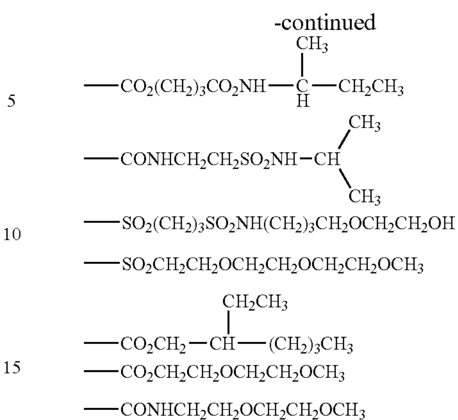

The dye (2) can have one or more of the respective water-soluble groups and hydrogen bond groups as described above per molecule. Moreover, use can be made of a blend of species having the common structure of the dye (2) and different water-soluble groups and/or hydrogen bond groups from molecule to molecule. Appropriate selection of these groups as discussed above contributes to the design of various characteristics (fastness to ozone, solubility, color hue, etc.) of the dye (2) and, in its turn, the ink composition.

The dye (2) may be used alone. Alternatively, it may be used together with other phthalocyanine dyes. In the combined use, the dye according to the invention may be blended with another phthalocyanine dye. It is also possible to employ, in course of the synthesis of the dye of the general formula (2), an analog of the phthalonitrile derivative (compound P) or the diminoisoindoline derivative (compound Q) having a substituent Xp different from that according to the invention or having no such substituent to thereby prepare a phthalocyanine mixture.

(Pigment)

As the pigment to be used in the invention, use can be made of commercially available products as well as publicly known ones reported in various documents. Examples of such documents include *Color Index*, (ed. by The Society of Dyers and Colourists); *Kaitei Shinpan Ganryo Binran*, ed. by Nippon Ganryo Gijutu Kyokai (1989); *Saishin Ganryo Oyo Gijutsu*, CMC Shuppan (1986); *Insatsu Inki Gijutsu*, CMC Shuppan (1984); W. Herbst and K. Hunger, Industrial Organic Pigments (VCH Verlagsgesellschaft, 1993); etc. More specifically speaking, examples thereof include organic pigments such as azo pigments (azo lake pigments, insoluble azo pigments, fused azo pigment and chelate azo pigment), polycyclic pigments (phthalocyanine pigments, anthraquuinone pigments, perylene and perynone pigments, indigo pigments, quinacridone pigments, dioxazine pigments, isoindolinone pigments, quinophthalone pigments, diketopyrrolopyrole pigments, etc.), dye lake pigments (lake pigments of acidic or basic dyes), azine pigments and so on, and inorganic pigments such as yellow pigments (C.I. Pigment Yellow Nos. 34, 37, 42, 53, etc.), red pigments (C.I. Pigment Red Nos. 101, 108, etc.), blue pigments (C.I. Pigment Blue Nos. 27, 29, 17:1, etc.), black pigments (C.I. Pigment Black No. 7, magnetite, etc.) and white pigments (C.I. Pigment White Nos. 4, 6, 18, 21, etc.).

As pigments having favorable color tone for image formation, it is preferable to use, as blue or cyan pigments, phthalocyanine pigments, indanthrone pigments falling within the category of anthraquinone type (for example, C.I. Pigment Blue No. 60) and triarylcarbonium pigments falling within the category of dye lake pigments. It is still preferable to use phthalocyanine pigments (preferable examples thereof including copper phthalocyanine pigments such as C.I. Pigment Blue Nos. 15:1, 15:2, 15:3, 15:4, 15:6, monochloro- or low-chlorinated copper phthalocyanine, aluminum phthalocyanine such as the one described in EP 860475, nonmetal phthalocyanine such as C.I. Pigment Blue No. 16 and phthalocyanine pigments having Zn, Ni or Ti as the center metal, and, among all, C.I. Pigment Blue Nos. 15:3 and 15:4 and aluminum phthalocyanine being most desirable).

As red or purple pigments, it is preferable to use azo pigments (preferable examples thereof including C.I. Pigment Red Nos. 3, 5, 11, 22, 38, 48:1, 48:2, 48:3, 48:4, 49:1, 52:1, 53:1, 57:1, 63:2, 144, 146 and 184), still preferably C.I. Pigment Red Nos. 57:1, 146 and 184; quinacridone pigments (preferable examples thereof including C.I. Pigment Red Nos. 122, 192, 202, 207 and 209 and C.I. Pigment Violet Nos. 19 and 42, and, among all, C.I. Pigment Red No. 122 being most desirable), triarylcarbonium pigments falling within the category of dye lake pigments (preferable examples thereof including xanthene-based C.I. Pigment Red No. 81:1 and C.I. Pigment Violet Nos. 1, 2, 3, 27 and 39), dioxadine pigments (for example, C.I. Pigment Violet Nos. 23 and 37), diketopyrrolopyrole pigments (for example, C.I. Pigment Red 254), perylene pigments (for example, C.I. Pigment Violet No. 29), anthraquinone pigments (for example, C.I. Pigment Violet Nos. 5:1, 31 and 33) and thioindigo pigments (for example, C.I. Pigment Red Nos. 38 and 88).

As yellow pigments, it is preferable to use azo pigments (preferable examples thereof including monoazo pigments such as C.I. Pigment Yellow Nos. 1, 3, 74 and 98, disazo pigments such as C.I. Pigment Yellow Nos. 12, 13, 14, 16, 17 and 83, general azo type pigments such as C.I. Pigment Yellow Nos. 93, 94, 95, 128 and 155, benzimidazolone pigments such as C.I. Pigment Yellow Nos. 120, 151, 154, 156 and 180 and so on, and, among all, those not produced from benzidine compounds being still preferable), isoindoline and isoindolinone pigments (preferable examples including C.I. Pigment Yellow Nos. 109, 110, 137 and 139), quinophthalone pigments (preferable examples thereof including C.I. Pigment Yellow No. 138) and flavantrone pigments (for example, C.I. Pigment Yellow No. 24).

As black pigments, preferable examples include inorganic pigments (preferable examples thereof including carbon black and magnetite) and aniline black.

Furthermore, use may be made of orange pigments (C.I. Pigment Orange Nos. 13 and 16, etc.) or green pigments (C.I. Pigment Green No. 7, etc.).

The pigment usable in the invention may be a naked pigment as described above. Alternatively, a surface-treated pigment maybe used. Methods of the surface-treatment include coating the pigment surface with a resin or wax, adhering a surfactant, bonding a reactive substance (for example, a silane coupling agent, an epoxy compound, polyisocyanate or a radical formed from a diazonium salt) to the pigment surface. These methods are described in the following documents and patents.

(1) *Kinzoku Sekken no Seishitsu to Oyo* (Saiwai Shobo)
(2) *Insatsu Inki Insatsu* (CMC Shuppan, 1984)
(3) *Saishin Ganryo Oyo Gisutsu* (CMC Shuppan, 1986)
(4) U.S. Pat. No. 5,554,739 and U.S. Pat. No. 5,571,311
(5) JP-A-9-151342, JP-A-10-140065, JP-A-10-292143 and JP-A-11-166145

In particular, self-dispersible pigments prepared by treating carbon black with a diazonium salt as described in the above US Patents (4) and capsulated pigments prepared by the method described in the above Japanese Patents (5) are effective, since high dispersion stability can be established thereby without using any excessive dispersant in the ink.

In the invention, a pigment may be dispersed by further using a dispersant. As the dispersant, use can be made of various publicly known dispersants (for example, a low-molecular weight dispersant of the surfactant type and a high-molecular weight dispersant) selected depending on the pigment to be employed. As examples of the dispersants, those described in JP-A-3-69949 and EP 549486 may be cited. In the case of using a dispersant, it is also possible to add a pigment derivative called a synergist to thereby promote the adsorption of the dispersant by the pigment.

It is preferable that the particle size of the pigment usable in the invention ranges from 0.01 to 10 μm, still preferably from 0.05 to 1 μm after the dispersion.

As a method of dispersing the pigment, use can be made of publicly known techniques employed in producing inks or toners. Examples of dispersing machines include a vertical or horizontal agitator mill, an attoliter, a colloid mill, a ball mill, a three-roll mill, a pearl mill, a supermill, an impeller, a disperser, a KD mill, a Dynatron, a pressure kneader and so on. These machines are described in detail in *Saishin Ganryo Oyo Gijutsu* (CMC Shuppan, 1986).

Because of having a high image durability, the ink composition according to the invention is usable in image recording of various types. The imaging dye is usable in, for example, photosensitive photographic materials, thermal transfer materials, heat-sensitive/pressure-sensitive recording materials, inkjet recording and so on. Among all, it is preferable to use an ink composition for inkjet recording.

In addition to the patent documents as cited above, methods of preparing ink compositions are reported in detail by JP-A-5-295312, JP-A-7-97541 and JP-A-7-82515, which are applicable to the preparation of the ink composition according to the invention.

[Inkjet Recording Method]

In the inkjet recording method according to the invention, energy is supplied to the above-described ink for inkjet recording and thus an image is formed on a publicly known image-receiving material such as plain paper, resin-coated paper, inkjet papers (for example, those reported in JP-A-8-169172, JP-A-8-27693, JP-A-2-276670, JP-A-7-276789, JP-A-9-323475, JP-A-62-238783, JP-A-10-153989, JP-A-10-217473, JP-A-10-235995, JP-A-10-337947, JP-A-10-217597, JP-A-10-337947, etc.), films, electrophotographic papers, fabrics, glasses, metals, ceramics and so on. As the image-receiving material, an image-receiving material having an ink-receiving layer containing inorganic white pigment particles on a support is preferred. The statement in JP-A-2003-306623 (paragraphs [0093] to [0105]) is applicable to the inkjet recording method according to the invention.

In the film-forming step, it is also possible to use a polymer latex compound in order to impart gloss and water-proofness or improve weatherability. The latex compound may be added to the image-receiving material either before, after or simultaneously with the addition of the coloring agent. Thus, it may be added either to the image-receiving paper or the ink. Alternatively, the polymer latex may be used per se as a liquid. More specifically speaking, use may be preferably made of methods described in JP-A-2002-166638, JP-A-2002-121440, JP-A-2002-154201, JP-A-2002-144696, JP-A-2002-080759, JP-A-2000-299465 and JP-A-2000-297365.

Layers (including a back coat layer) constituting the inkjet recording paper or the recording film may contain a polymer latex. The polymer latex is employed to improve film properties, for example, dimensional stabilization, prevention of curling, prevention of sticking, prevention of film cracking, etc. Such polymer latexes are described in JP-A-62-245258, JP-A-62-1316648 and JP-A-62-110066. By adding a polymer latex having a low glass transition temperature (40° C. or lower) to a layer containing a mordant, the layer can be prevented from cracking or curling. By adding a polymer latex having a high glass transition temperature to the back coat layer, curing can be also prevented.

The ink composition according to the invention may be used as an ink set containing the same for forming a color image, as described above. In the invention, the inkjet recording system is not particularly restricted. Namely, the invention is applicable to various publicly known systems, for example, the charge-control system wherein an ink is jetted using static attraction, the drop on demand system (pressure pulse system) with the use of vibration pressure of a piezo element, a sonic inkjet system wherein an electric signal is converted into a sonic beam and irradiated to an ink so that the ink is jetted under the radiation pressure, and the thermal inkjet (bubble jet) system wherein ink is heated to form bubbles and the pressure thus generated is employed.

Inkjet recording systems include a system wherein a large number of inks with low density, which are called photoinks, are jetted each in a small volume; a system wherein plural inks having substantially the same color hue but different densities are employed to improve image qualities; and a system with the use of a colorless and transparent ink.

EXAMPLES

To further illustrate the invention, and not by way of limitation, the following Examples will be given.

(Preparation of Ink Composition)

The components listed in Table 3 were dissolved under stirring while heating to 30 to 40° C. for 1 hour. Then the mixture was filtered under reduced pressure through a microfilter having an average pore size of 0.25 μm, thereby giving individual ink compositions.

TABLE 3

| | Ink No. | | | |
|---|---|---|---|---|
| | LC-101 Invention | LC-02 Comparison | LC-03 Comparison | LC-04 Comparison |
| Dye type | Dye-A | Dye-A | Dye-B | Dye-C |
| Dye concentration | 17.0 | 17.0 | 17.0 | 17.0 |
| Aminoguanidine hydrochloride | 17.0 | — | 17.0 | 17.0 |
| Glycerol | 110 | 110 | 110 | 110 |
| Triethylene glycol | 45 | 45 | 45 | 45 |
| Triethylene glycol monobutyl ether | 100 | 100 | 100 | 100 |
| 1,2-Hexanediol | 35 | 35 | 35 | 35 |
| Urea | 25 | 25 | 25 | 25 |
| Triethanolamine | 2.0 | 2.0 | 2.0 | 2.0 |
| Proxel XLII(S) | 1.0 | 1.0 | 1.0 | 1.0 |
| Benzotriazole | 0.015 | 0.015 | 0.015 | 0.015 |
| Surfactant (Olfine E1010) | 30 | — | 30 | 30 |

Adjusted to 1 L by adding super-purified water (specific resistance: 18 MΩ · cm or above)
(Expressed in g/L)

Next, the structures of the dyes will be given.

Dye-A

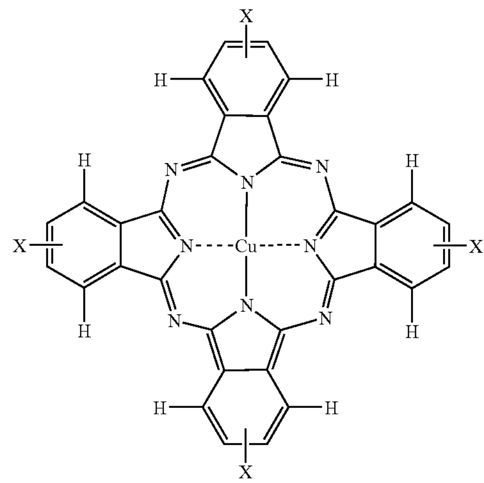

X=$SO_2(CH_2)_3SO_3Li$, $SO_2(CH_2)_3SO_2NHCH_2CH(CH_3)OH$ $SO_2(CH_2)_3SO_3Li$:$SO_2(CH_2)_3SO_2NHCH_2CH(CH_3)OH$=2:2

Dye-B C.I. Direct Blue 199

Dye-C C.I. Direct Blue 86

The viscosity at 25° C. of each ink was measured with a vibratory viscometer Model VM-100A-L (manufactured by Yamaichi Electronics). The static surface tension was measured with an automatic surface tension meter Model CBVP-A3 (manufactured by Kyowa Interface Science). Moreover, the oxidation potential of each dye was measured. Table 4 shows the measurement data.

TABLE 4

| Ink no. | Oxidation potential of dye [V(vs SCE)] | Viscosity [mPa · s] | Static surface tension [mN/m] |
|---|---|---|---|
| LC-01 (Invention) | 1.3 | 4.57 | 31.0 |
| LC-02 (Comparison) | 1.3 | 4.46 | 34.2 |
| LC-03 (Comparison) | 0.81 | 4.46 | 31.0 |
| LC-04 (Comparison) | 0.76 | 4.37 | 30.8 |

(Inkjet Recording)

The above inks LC-01 to LC-04 were each packed in a light cyan ink cartridge of an ink jet printer Model PM-G800

(manufactured by EPSON). Then an image was printed by the printer on a glossy inkjet photopaper KASSAI manufactured by Fuji Photo Film Co., Ltd., followed by the following evaluation. Table 5 shows the evaluation data.

(Evaluation of Fastness to Ozone)

A stepwise patch image in a cyan color was printed. 24 hours after printing, the reflection density of each density area of the patch parts in this stepwise patch image was measured with a reflection densitometer (X-Rite 310TR) provided with a status A filter (Ci). The sample was stored in an ozone gas fading tester in which ozone gas level in the box could be adjusted to 5 mg/L, thereby carrying out a fading test. As the ozonizer, a marketed apparatus of the high-voltage discharge type (5 kV AC) was employed, while the ozone gas level was designed and controlled with the use of an ozone gas monitor manufactured by APPLICS (model: OZG-EM-01).

After storing for 1 weeks, the image density was measured again to determine the density after storing (Cf). Thus, the dye residual ratio [%] (Cf/Ci)×100 was calculated. To determine the dye residual ratio, data at reflection density Ci of 0.9 to 1.1 were employed.

(Evaluation of Fastness to Light)

Similar to the evaluation of fastness to ozone, printing and image density measurement were carried out. Then the sample was irradiated a xenon lamp (85000 lx) using a weather meter (manufactured by Atlas) for 2 weeks. Then the image density Df was measured again to determine the dye residual ratio [%]=(Df/Di)×100. To determine the dye residual ratio, data at reflection density Di of 0.9 to 1.1 were employed.

(Evaluation of Penetration)

As a means of measuring a penetration of an ink droplet into a recording medium, the measurement system shown in FIG. 6 of JP-A-2003-300374 was employed. A recording head was driven by head-driving signals for inkjetting. At the same time, a circuit for providing a definite time-lag was controlled. Thus, ink droplets flying in the vicinity of the recording medium were irradiated with light from a lamp within a short period of time and photographed with a CCD camera at a definite scale of enlargement. By using this constitution, the contact timing of the ink droplet top end with the recording medium and the penetration timing of the whole ink droplet into the recording medium were determined from a plural number of images photographed under controlling the time-lag. Thus, the penetration time after the impact of the ink droplet was calculated based on the timing difference.

TABLE 5

| Ink No. | Ozon fastness Dye residual ratio | Light fastness Dye residual ratio | Penetration Penetration time |
|---|---|---|---|
| LC-01 (Invention) | 85% | 93% | 9.2 ms |
| LC-02 (Comparison) | 73% | 88% | 24.4 ms |
| LC-03 (Comparison) | 37% | 82% | 9.2 ms |
| LC-04 (Comparison) | 25% | 77% | 9.0 ms |

The comparative cases LC-03 and LC-04 are combinations described in JP-A-2003-138184.

As the data given in Table 5 indicate, excellent fastness to zone and excellent fastness to light can be achieved by using the ink composition according to the invention.

With respect to fastness to ozone, a practically available dye residual ratio was estimated as about 80%. Thus, the time required for attaining the dye residual ratio of 80% was determined and converted into data in the practical environment (ozone level). As a result, it was estimated that the life of LC-01 would be about 15 years while that of LC-02 would be about 8 years and those of LC-03 and LC-04 would be 2 years or shorter.

Similar results were obtained by substituting the image receiving paper used in the invention by photographic paper manufactured by Seiko Epson and PR101 manufactured by Canon.

According to the invention, it is possible to provide a cyan ink for inkjet recording which is excellent in fastness to gas (fastness to ozone) and enables the formation of a high-quality image free from bleeding or beading, and an inkjet recording method.

The entire disclosure of each and every foreign patent application from which the benefit of foreign priority has been claimed in the present application is incorporated herein by reference, as if fully set forth.

What is claimed is:

1. An ink composition comprising:

a coloring agent having an oxidation potential of more electropositive than 1.0V (vs SCE) and being a dye represented by formula (2):

Formula (2):

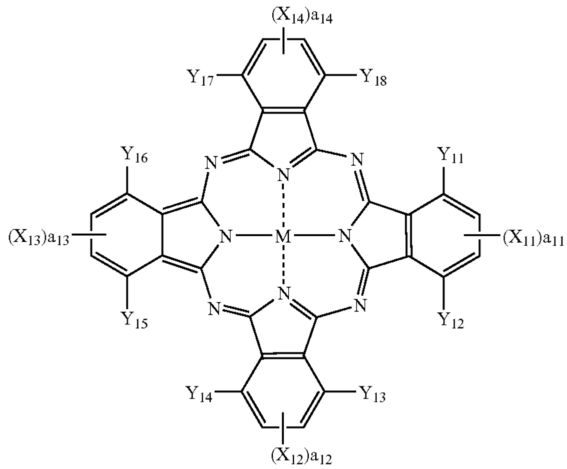

wherein $X_{11}$, $X_{12}$, $X_{13}$ and $X_{14}$ each independently represents —SO-Z, —$SO_2$-Z, —$SO_2NR_{11}R_{12}$, a sulfo group, —$CONR_{11}R_{12}$ or —$CO_2R_{11}$;

Z's each independently represent an alkyl group, an alkenyl group, an aralkyl group, an aryl group or a heterocyclic group, which may be further substituted by a substituent;

$R_{11}$ and $R_{12}$ each independently represents a hydrogen atom, an alkyl group, an alkenyl group, an aralkyl group, an aryl group or a heterocyclic group, which may be further substituted by a substituent;

$Y_{11}$, $Y_{12}$, $Y_{13}$, $Y_{14}$, $Y_{15}$, $Y_{16}$, $Y_{17}$ and $Y_{18}$ each independently represents a hydrogen atom or a monovalent substituent;

$a_{11}$ to $a_{14}$ respectively stand for the numbers of substituents in $X_{11}$ to $X_{14}$ and each independently represents an integer of 1 or 2; and M represents a hydrogen atom, or a metal atom or an oxide, a hydroxide or a halide of the metal atom;

a water;

a guanidine compound selected from one of the following compounds:

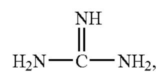

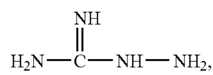

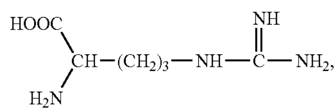

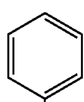

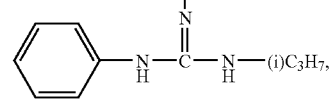

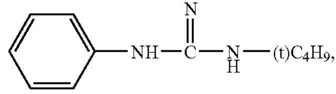

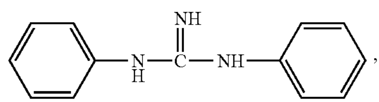

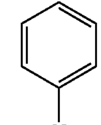

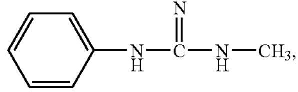

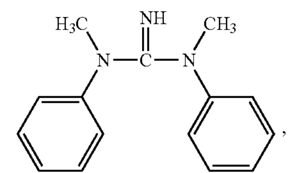

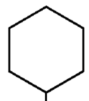

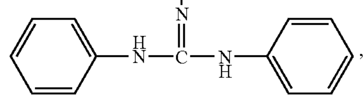

-continued

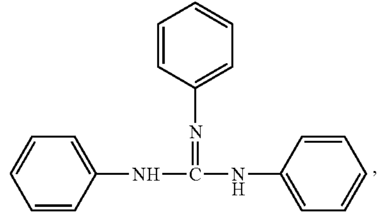

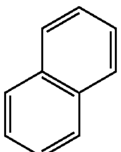

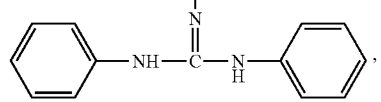

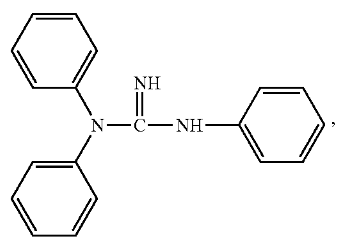

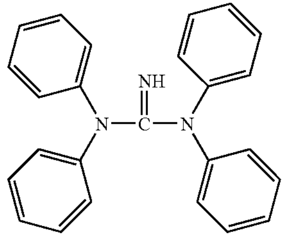

and

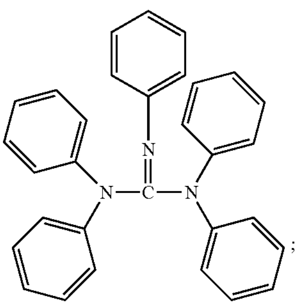

and a surfactant.

2. The ink composition according to claim 1, wherein a content of the guanidine compound in the ink composition is from 0.1 to 10% by mass.

3. The ink composition according to claim 1, wherein a content of the surfactant in the ink composition is from 0.05 to 50 g/l.

4. The ink composition according to claim 1, wherein the surfactant is a nonionic surfactant.

5. The ink composition according to claim 4, wherein the nonionic surfactant is an acetylene glycol-base surfactant.

6. The ink composition according to claim 1, wherein at least one of $X_{11}$ to $X_{14}$ represents a water-soluble group, and at least one of $X_{11}$ to $X_{14}$ other than the at least one of $X_{11}$ to $X_{14}$ representing the water-soluble group represents a hydrogen bond group.

7. The ink composition according to claim 6, wherein a group number ratio of the water-soluble group (x)/the hydrogen bond group (y) is $(0<x<3)/(1<y<4)$.

8. The ink composition according to claim 6, wherein the water-soluble group is $SO_2(CH_2)_3SO_3Li$ and the hydrogen bond group is $SO_2(CH_2)_3SO_2NHCH_2CH(CH_3)OH$.

9. The ink composition according to claim 1, which is utilized in inkjet recording.

10. An inkjet recording method which comprises jetting an ink composition according to claim 1.

11. The ink composition according to claim 4, wherein the nonionic surfactant is a compound represented by formula (I), (II) or (III):

$$R^{21}O(CH_2CH_2O)_{m_1}H \quad \text{Formula (I)}$$

wherein $R^{21}$ represents an alkyl group having from 5 to 40 carbon atoms; and $m_1$ stands for the average number of ethylene oxide moles added which ranges from 2 to 40;

$$R^{24}COO(CH_2CH_2O)_{m_2}H \quad \text{Formula (II)}$$

wherein $R^{24}$ represents an alkyl group having from 5 to 40 carbon atoms; and $m_2$ stands for the average number of ethylene oxide moles added which ranges from 2 to 40;

Formula (III)

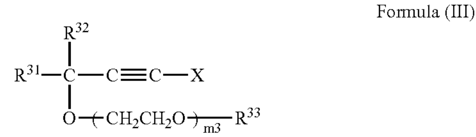

wherein $R^{31}$ and $R^{32}$ each independently represents an alkyl group having from 1 to 18 carbon atoms;

$R^{33}$ represents a hydrogen atom or an alkyl group having from 1 to 4 carbon atoms;

X represents a hydrogen atom, or

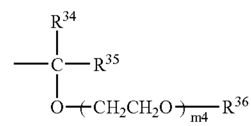

wherein $R^{34}$ and $R^{35}$ each independently represents an alkyl group having from 1 to 18 carbon atoms;

$R^{36}$ represents a hydrogen atom, an alkyl group having from 1 to 6 carbon atoms or a phenyl group; and $m^3$ and $m^4$ each independently represents an average number of ethylene oxide moles added, provided that $m^3+m^4$ ranges from 0 to 100, and provided that when $m^3$ is 0, $R^{33}$ represents a hydrogen atom, when $m^4$ is 0, $R^{36}$ represents a hydrogen atom and when X is a hydrogen atom, $m^3$ is from 1 to 100.

* * * * *